United States Patent
Lutter et al.

(10) Patent No.: US 10,681,341 B2
(45) Date of Patent: Jun. 9, 2020

(54) USING A SPHERE TO REORIENT A LOCATION OF A USER IN A THREE-DIMENSIONAL VIRTUAL REALITY VIDEO

(71) Applicant: VERIZON PATENT AND LICENSING INC., Basking Ridge, NJ (US)

(72) Inventors: Rory Lutter, Palo Alto, CA (US); Andrew Walkingshaw, Palo Alto, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/157,890

(22) Filed: Oct. 11, 2018

(65) Prior Publication Data

US 2019/0052869 A1 Feb. 14, 2019

Related U.S. Application Data

(63) Continuation-in-part of application No. 15/677,178, filed on Aug. 15, 2017, now Pat. No. 10,313,665, (Continued)

(51) Int. Cl.
*H04N 13/366* (2018.01)
*H04N 19/172* (2014.01)
(Continued)

(52) U.S. Cl.
CPC .......... *H04N 13/366* (2018.05); *G06F 3/011* (2013.01); *H04N 13/344* (2018.05);
(Continued)

(58) Field of Classification Search
CPC .. H04N 13/366; H04N 13/344; H04N 19/597; H04N 19/162; H04N 19/119; H04N 19/172; G06F 3/01
See application file for complete search history.

(56) References Cited

U.S. PATENT DOCUMENTS

| 4,507,683 A | 3/1985 | Griesshaber et al. |
| 5,495,576 A | 2/1996 | Ritchey |

(Continued)

FOREIGN PATENT DOCUMENTS

| RU | 2382406 | 2/2010 |
| RU | 2421933 | 6/2011 |
| WO | 2012/113988 | 8/2012 |

OTHER PUBLICATIONS

Mase, et al., "Socially assisted multi-view video viewer", Proceedings of the 13th International Conference on Multimodal Interfaces, ACM, Nov. 2011, pp. 319-322.

*Primary Examiner* — Tat C Chio

(57) ABSTRACT

A method includes generating graphical data for displaying a virtual reality user interface that includes a three-dimensional (3D) virtual reality video that is illustrated as being inside a sphere. The method further includes determining, based on movement of a peripheral device, that a user selects the sphere in the virtual reality user interface and the user moves the sphere on a head of the user. The method further includes displaying the 3D virtual reality video in the sphere surrounding the head of the user such that the user views a 360 degree environment corresponding to the 3D virtual reality video.

20 Claims, 12 Drawing Sheets

Related U.S. Application Data which is a continuation of application No. 15/269,734, filed on Sep. 19, 2016, now Pat. No. 9,774,887.

(51) Int. Cl.

| | | |
|---|---|---|
| *H04N 19/119* | (2014.01) | |
| *H04N 19/162* | (2014.01) | |
| *H04N 19/597* | (2014.01) | |
| *H04N 13/344* | (2018.01) | |
| *G06F 3/01* | (2006.01) | |

(52) U.S. Cl.
CPC ......... *H04N 19/119* (2014.11); *H04N 19/162* (2014.11); *H04N 19/172* (2014.11); *H04N 19/597* (2014.11); *G06F 2203/04802* (2013.01)

(56) References Cited

U.S. PATENT DOCUMENTS

| | | |
|---|---|---|
| 6,128,108 A | 10/2000 | Teo |
| 6,141,034 A | 10/2000 | McCutchen |
| 6,212,468 B1 | 4/2001 | Nakayama et al. |
| 6,747,644 B1 | 6/2004 | Deering |
| 6,767,287 B1 | 7/2004 | McQuaid et al. |
| 6,865,289 B1 | 3/2005 | Berestov |
| 7,155,680 B2 | 12/2006 | Akazawa et al. |
| 7,884,848 B2 | 2/2011 | Ginther |
| 8,478,111 B2 | 7/2013 | Stankiewicz et al. |
| 8,581,961 B2 | 11/2013 | Lee |
| 8,644,596 B1 | 2/2014 | Wu et al. |
| 8,681,224 B2 | 3/2014 | Mallon et al. |
| 8,750,509 B2 | 6/2014 | Renkis |
| 8,848,066 B2 | 9/2014 | Porter et al. |
| 8,867,827 B2 | 10/2014 | Yeatman et al. |
| 9,001,226 B1 | 4/2015 | Ng et al. |
| 9,262,831 B2 | 2/2016 | Munzenmayer et al. |
| 9,264,598 B1 | 2/2016 | Baldwin |
| 9,282,367 B2 | 3/2016 | Daub |
| 9,396,588 B1 | 7/2016 | Li |
| 9,589,350 B1 | 3/2017 | Kozko |
| 9,742,991 B2 | 8/2017 | Latorre |
| 9,774,887 B1 | 9/2017 | Walkingshaw |
| 9,911,454 B2 | 3/2018 | Van Hoff et al. |
| 10,210,898 B2 | 2/2019 | Van Hoff et al. |
| 10,313,665 B2 | 6/2019 | Walkingshaw |
| 2001/0015751 A1 | 8/2001 | Geng |
| 2002/0075295 A1 | 6/2002 | Stentz et al. |
| 2002/0171741 A1 | 11/2002 | Tonkin et al. |
| 2003/0025805 A1 | 2/2003 | Yamagishi |
| 2003/0117488 A1 | 6/2003 | Pierce et al. |
| 2004/0008256 A1 | 1/2004 | Kim |
| 2004/0027451 A1 | 2/2004 | Baker |
| 2004/0066449 A1 | 4/2004 | Givon |
| 2004/0196378 A1 | 10/2004 | Kannermark et al. |
| 2004/0246333 A1 | 12/2004 | Steuart |
| 2005/0062869 A1 | 3/2005 | Zimmermann et al. |
| 2005/0069167 A1 | 3/2005 | Zarrabizadeh |
| 2006/0082663 A1 | 4/2006 | Rooy et al. |
| 2007/0027844 A1 | 2/2007 | Toub et al. |
| 2007/0035627 A1 | 2/2007 | Cleary et al. |
| 2007/0097206 A1 | 5/2007 | Houvener et al. |
| 2007/0146530 A1 | 6/2007 | Nose |
| 2007/0159527 A1 | 7/2007 | Kim et al. |
| 2007/0263076 A1 | 11/2007 | Andrews et al. |
| 2008/0091526 A1 | 4/2008 | Shoemaker |
| 2008/0143842 A1 | 6/2008 | Gillard et al. |
| 2008/0262910 A1 | 10/2008 | Altberg et al. |
| 2008/0263458 A1 | 10/2008 | Altberg et al. |
| 2009/0076894 A1 | 3/2009 | Bates et al. |
| 2009/0238378 A1 | 9/2009 | Kikinis et al. |
| 2009/0249244 A1 | 10/2009 | Robinson et al. |
| 2009/0288002 A1 | 11/2009 | Hamilton et al. |
| 2010/0036735 A1 | 2/2010 | Hamilton et al. |
| 2010/0045773 A1 | 2/2010 | Ritchey |
| 2010/0083139 A1 | 4/2010 | Dawson et al. |
| 2010/0097444 A1 | 4/2010 | Lablans |
| 2010/0100429 A1 | 4/2010 | McCloskey et al. |
| 2010/0119105 A1 | 5/2010 | Moriya et al. |
| 2010/0164956 A1 | 7/2010 | Hyndman et al. |
| 2010/0169842 A1 | 7/2010 | Migos |
| 2010/0315479 A1 | 12/2010 | Wijngaarden et al. |
| 2010/0318467 A1 | 12/2010 | Porter et al. |
| 2010/0332980 A1 | 12/2010 | Sun et al. |
| 2011/0058749 A1 | 3/2011 | Cooper |
| 2011/0142132 A1 | 6/2011 | Tourapis et al. |
| 2011/0157305 A1 | 6/2011 | Kosakai et al. |
| 2011/0193956 A1 | 8/2011 | Gilg et al. |
| 2011/0267510 A1 | 11/2011 | Malone et al. |
| 2012/0056977 A1 | 3/2012 | Ohnishi |
| 2012/0069236 A1 | 3/2012 | Namba et al. |
| 2012/0105632 A1 | 5/2012 | Renkis |
| 2012/0155786 A1 | 6/2012 | Zargarpour et al. |
| 2012/0162362 A1 | 6/2012 | Garden et al. |
| 2012/0169842 A1 | 7/2012 | Chuang et al. |
| 2012/0194712 A1 | 8/2012 | Crook et al. |
| 2012/0203640 A1 | 8/2012 | Karmarkar et al. |
| 2012/0218296 A1 | 8/2012 | Belimpasakis et al. |
| 2012/0218376 A1 | 8/2012 | Athan |
| 2012/0232998 A1 | 9/2012 | Schoen |
| 2012/0240077 A1 | 9/2012 | Vaittinen et al. |
| 2012/0242788 A1 | 9/2012 | Chuang et al. |
| 2012/0257095 A1 | 10/2012 | Velazquez |
| 2012/0290401 A1 | 11/2012 | Neven |
| 2012/0310717 A1 | 12/2012 | Kankainen |
| 2012/0324493 A1 | 12/2012 | Holmdahl et al. |
| 2012/0324494 A1 | 12/2012 | Burger et al. |
| 2013/0016186 A1 | 1/2013 | Atanassov et al. |
| 2013/0031475 A1 | 1/2013 | Maor et al. |
| 2013/0035110 A1 | 2/2013 | Sridhara et al. |
| 2013/0044187 A1 | 2/2013 | Hammes et al. |
| 2013/0054576 A1 | 2/2013 | Karmarkar et al. |
| 2013/0080974 A1 | 3/2013 | Suzuki |
| 2013/0083159 A1 | 4/2013 | Ooshima |
| 2013/0103624 A1 | 4/2013 | Thieberger |
| 2013/0117375 A1 | 5/2013 | Bist et al. |
| 2013/0124471 A1 | 5/2013 | Chen et al. |
| 2013/0188010 A1 | 7/2013 | Dortch et al. |
| 2013/0212606 A1 | 8/2013 | Kannan et al. |
| 2013/0223537 A1 | 8/2013 | Kasai et al. |
| 2013/0235347 A1 | 9/2013 | Hennessey et al. |
| 2013/0250047 A1 | 9/2013 | Hollinger |
| 2013/0258044 A1 | 10/2013 | Betts-Lacroix |
| 2013/0259447 A1 | 10/2013 | Sathish et al. |
| 2013/0266211 A1 | 10/2013 | Tippetts et al. |
| 2013/0278631 A1 | 10/2013 | Border et al. |
| 2013/0278635 A1 | 10/2013 | Maggiore |
| 2014/0067828 A1 | 3/2014 | Archibong et al. |
| 2014/0071234 A1 | 3/2014 | Millett |
| 2014/0086446 A1 | 3/2014 | Han et al. |
| 2014/0089097 A1 | 3/2014 | Byun et al. |
| 2014/0097251 A1 | 4/2014 | Joussen et al. |
| 2014/0099022 A1 | 4/2014 | McNamer |
| 2014/0099623 A1 | 4/2014 | Amit et al. |
| 2014/0104378 A1 | 4/2014 | Kauff et al. |
| 2014/0126066 A1 | 5/2014 | Clavin et al. |
| 2014/0146132 A1 | 5/2014 | Bagnato et al. |
| 2014/0153916 A1 | 6/2014 | Kintner |
| 2014/0176749 A1 | 6/2014 | Horowitz |
| 2014/0184550 A1 | 7/2014 | Hennessey et al. |
| 2014/0201126 A1 | 7/2014 | Zadeh et al. |
| 2014/0237495 A1 | 8/2014 | Jang et al. |
| 2014/0245335 A1 | 8/2014 | Holden et al. |
| 2014/0247352 A1 | 9/2014 | Rathi et al. |
| 2014/0267596 A1 | 9/2014 | Geerds |
| 2014/0270684 A1 | 9/2014 | Jayaram et al. |
| 2014/0280549 A1 | 9/2014 | Rajan et al. |
| 2014/0285486 A1 | 9/2014 | Chang et al. |
| 2014/0300532 A1 | 10/2014 | Karkkainen et al. |
| 2014/0309495 A1 | 10/2014 | Kirma et al. |
| 2014/0310630 A1 | 10/2014 | Asikainen et al. |
| 2014/0320608 A1 | 10/2014 | Muukki |
| 2014/0341484 A1 | 11/2014 | Sebring |
| 2014/0359647 A1 | 12/2014 | Shoemake et al. |
| 2014/0359656 A1 | 12/2014 | Banica et al. |

(56) References Cited

U.S. PATENT DOCUMENTS

| | | |
|---|---|---|
| 2014/0368609 A1 | 12/2014 | Chang et al. |
| 2015/0012827 A1 | 1/2015 | Elmeih et al. |
| 2015/0026718 A1 | 1/2015 | Seyller |
| 2015/0042953 A1 | 2/2015 | Teller |
| 2015/0050006 A1 | 2/2015 | Sipe |
| 2015/0058630 A1 | 2/2015 | Bae et al. |
| 2015/0067708 A1 | 3/2015 | Jensen et al. |
| 2015/0124088 A1 | 5/2015 | Vera et al. |
| 2015/0130705 A1 | 5/2015 | Im |
| 2015/0138065 A1 | 5/2015 | Alfieri |
| 2015/0169076 A1 | 6/2015 | Cohen et al. |
| 2015/0199006 A1 | 7/2015 | He et al. |
| 2015/0206329 A1 | 7/2015 | Devries |
| 2015/0208131 A1 | 7/2015 | Chatter et al. |
| 2015/0220768 A1 | 8/2015 | Ronnecke et al. |
| 2015/0235434 A1 | 8/2015 | Miller et al. |
| 2015/0248918 A1 | 9/2015 | Tang |
| 2015/0260526 A1 | 9/2015 | Paduano et al. |
| 2015/0264092 A1 | 9/2015 | Herger et al. |
| 2015/0271483 A1 | 9/2015 | Sun et al. |
| 2015/0309310 A1* | 10/2015 | Cho .................. G02B 27/017 348/158 |
| 2015/0316982 A1 | 11/2015 | Miller |
| 2015/0317353 A1 | 11/2015 | Zavesky |
| 2015/0350561 A1 | 12/2015 | Vartanian |
| 2015/0356371 A1 | 12/2015 | Libal et al. |
| 2015/0373266 A1 | 12/2015 | Hsieh et al. |
| 2016/0011658 A1 | 1/2016 | Lopez et al. |
| 2016/0026253 A1 | 1/2016 | Bradski et al. |
| 2016/0027216 A1 | 1/2016 | Da Veiga et al. |
| 2016/0037026 A1 | 2/2016 | Kintner |
| 2016/0037030 A1 | 2/2016 | Weissig et al. |
| 2016/0050370 A1 | 2/2016 | Campbell |
| 2016/0077710 A1 | 3/2016 | Lewis et al. |
| 2016/0156842 A1 | 6/2016 | Baldwin |
| 2016/0279516 A1 | 9/2016 | Gupta et al. |
| 2016/0286137 A1 | 9/2016 | Marks et al. |
| 2016/0295194 A1 | 10/2016 | Wang et al. |
| 2016/0306431 A1 | 10/2016 | Stafford et al. |
| 2017/0278306 A1 | 9/2017 | Rico |
| 2017/0280056 A1 | 9/2017 | Chapdelaine-Couture et al. |
| 2017/0329817 A1 | 11/2017 | Stoica-Beck et al. |
| 2018/0096507 A1* | 4/2018 | Valdivia .................. G06F 1/163 |
| 2018/0192094 A1* | 7/2018 | Barnett .................... G06K 9/52 |
| 2018/0357810 A1 | 12/2018 | Young et al. |
| 2019/0052869 A1 | 2/2019 | Lutter et al. |
| 2019/0052870 A1* | 2/2019 | Lutter .................. H04N 19/172 |
| 2019/0265945 A1* | 8/2019 | Newell .................... G06F 3/167 |

* cited by examiner

700

750

752

800

```
┌─────────────────────────────────────────────────────────────────────────────┐
│ Generate a set of three-dimensional virtual reality videos by stitching together image │
│        frames of one or more environments captured by a camera array 802        │
└─────────────────────────────────────────────────────────────────────────────┘
                                      ↓
┌─────────────────────────────────────────────────────────────────────────────┐
│ Generate graphical data for displaying a virtual reality user interface that includes (1) │
│ selectable icons that correspond to the set of three-dimensional virtual reality videos and │
│                                (2) an object 804                                │
└─────────────────────────────────────────────────────────────────────────────┘
                                      ↓
┌─────────────────────────────────────────────────────────────────────────────┐
│  Receive, from a peripheral device, a selection of the object by a user of the peripheral │
│  device in the virtual reality user interface and an indication of a desire to move the object │
│  to be positioned in front of a first three-dimensional virtual reality video from the set of │
│                             virtual reality videos 806                            │
└─────────────────────────────────────────────────────────────────────────────┘
                                      ↓
┌─────────────────────────────────────────────────────────────────────────────┐
│     Provide a three-dimensional preview of the first three-dimensional virtual reality video │
│                              within the object 808                              │
└─────────────────────────────────────────────────────────────────────────────┘
```

FIG 8

900 

Generate graphical data for displaying a virtual reality user interface that includes a three-dimensional virtual reality video that is illustrated as being inside a sphere 902

Determine, based on movement of a peripheral device, that a user selects the sphere in the virtual reality user interface and the user moves the sphere on a head of the user 904

Display the three-dimensional virtual reality video in the sphere surrounding the head of the user such that the user views a 360 degree environment corresponding to the three-dimensional virtual reality video 906

FIG 9

USING A SPHERE TO REORIENT A LOCATION OF A USER IN A THREE-DIMENSIONAL VIRTUAL REALITY VIDEO

CROSS REFERENCE TO RELATED APPLICATIONS

This application is a continuation-in-part of U.S. application Ser. No. 15/677,178, entitled "Behavioral Directional Encoding of Three-Dimensional Video" filed Aug. 15, 2017, which is a continuation of U.S. application Ser. No. 15/269,734, entitled "Behavioral Directional Encoding of Three-Dimensional Video" filed Sep. 19, 2016 (now U.S. Pat. No. 9,774,887), each of which is incorporated by reference.

FIELD

The embodiments discussed herein are related to generating a three-dimensional preview of a three-dimensional video. More particularly, the embodiments discussed herein relate to providing a movable object as part of a virtual reality user interface that a user moves in front of a selectable icon of a three-dimensional video to view a three-dimensional preview of the three-dimensional video within the object.

BACKGROUND

Generating virtual reality content for a 360° environment may be analogized to generating content that is displayed in a sphere that surrounds a user. Users that view the virtual reality content may experience virtual-reality sickness when viewing the virtual reality content. Virtual-reality sickness is caused by a difference between what a user views in a peripheral device and what the user's brain expects to feel. This is also known as a vestibular and visual mismatch and the most common symptom is nausea. Virtual-reality sickness is exacerbated when the users enter and exit multiple virtual reality videos, because the process of establishing equilibrium within a first virtual reality video, leaving the first virtual reality video, and entering a second virtual reality video is overwhelming sensory input for the user's brain to process.

Another problem with virtual-reality sickness occurs when a user is in the wrong location within a virtual reality video. For example, if the virtual reality video is of a mountain, the user may enter the video at the base of the mountain on the south side, but the user may prefer to enter the video at the top of the mountain on the north side. Having to move within the virtual reality video to be at the desired location may result in the user experiencing virtual-reality sickness. Previous virtual reality systems make no attempt to address this issue and reduce instances of virtual-reality sickness.

SUMMARY

A method includes generating graphical data for displaying a virtual reality user interface that includes a three-dimensional (3D) virtual reality video that is illustrated as being inside a sphere. The method further includes determining, based on movement of a peripheral device, that a user selects the sphere in the virtual reality user interface and the user moves the sphere on a head of the user. The method further includes displaying the 3D virtual reality video in the sphere surrounding the head of the user such that the user views a 360 degree environment corresponding to the 3D virtual reality video.

In some embodiments, the method further comprises determining, based on movement of the peripheral device, that the user moves the sphere closer to the head of the user and increasing a size of the sphere as the user moves the sphere closer to the head of the user. In some embodiments, the method further comprises responsive to displaying the 3D virtual reality in the sphere surrounding the head of the user, removing an edge of the sphere such that the sphere is invisible to the user, detecting, based on movement of the peripheral device, that a hand of the user is less than a threshold distance from the head of the user, and responsive to the hand of the user being less than the threshold distance from the head of the user, displaying an edge of the sphere. In some embodiments, the method further comprises detecting, based on movement of the peripheral device, that the user removes the sphere from the head of the user by grabbing along the edge of the sphere and displaying the 3D virtual reality video as part of the sphere and thereby no longer surrounding the head of the user. In some embodiments, the method further includes determining, based on movement of the peripheral device, that the user removes the sphere from the head of the user, displaying the sphere as moving away from the head of the user, receiving, from the peripheral device, data describing a rotation of the sphere, and displaying the sphere as being rotated including updating a viewing direction that corresponds to a location within the 3D virtual reality video that is displayed within the sphere. In some embodiments, the method further includes receiving a selection of the sphere in a rotated position from the user and displaying the 3D virtual reality video as surrounding the user in the location that corresponds to the rotated position. In some embodiments, the method further includes determining a viewing direction of the user based on a configuration of the object and rendering a first portion of the 3D virtual reality video that corresponds to the viewing direction of the user with a higher resolution than other portions of the 3D virtual reality video that do not correspond to the viewing direction of the user. In some embodiments, the method further includes determining, based on movement of the peripheral device, that the user moves the sphere to be on the head of the user and displaying the 3D virtual reality video in the sphere surrounding the head of the user in the location that corresponds to the rotated position. In some embodiments, the sphere includes an indicator of a progress of the 3D virtual reality video.

In some embodiments, a system comprises one or more processors; and a memory with instructions stored thereon that, when executed by the one or more processors, cause the one or more processors to perform operations comprising: generating graphical data for displaying a virtual reality user interface that includes a 3D virtual reality video that is illustrated as being inside a sphere, determining, based on movement of a peripheral device, that a user selects the sphere in the virtual reality user interface and the user moves the sphere on a head of the user; and displaying the 3D virtual reality video in the sphere surrounding the head of the user such that the user views a 360 degree environment corresponding to the 3D virtual reality video.

In some embodiments, the instructions cause the one or more processors to perform further operations comprising: determining, based on movement of the peripheral device, that the user moves the sphere closer to the head of the user and increasing a size of the sphere as the user moves the sphere closer to the head of the user. In some embodiments, the instructions cause the one or more processors to perform further operations comprising: responsive to displaying the 3D virtual reality in the sphere surrounding the head of the user, removing an edge of the sphere such that the sphere is invisible to the user, detecting, based on movement of the peripheral device, that a hand of the user is less than a threshold distance from the head of the user, and responsive to the hand of the user being less than the threshold distance from the head of the user, displaying an edge of the sphere. In some embodiments, the instructions cause the one or more processors to perform further operations comprising: detecting, based on movement of the peripheral device, that the user removes the sphere from the head of the user by grabbing along the edge of the sphere and displaying the 3D virtual reality video as part of the sphere and thereby no longer surrounding the head of the user. In some embodiments, the instructions cause the one or more processors to perform further operations comprising: determining, based on movement of the peripheral device, that the user removes the sphere from the head of the user, displaying the sphere as moving away from the head of the user, receiving, from the peripheral device, data describing a rotation of the sphere, and displaying the sphere as being rotated including updating a viewing direction that corresponds to a location within the 3D virtual reality video that is displayed within the sphere.

In some embodiments, a non-transitory computer readable medium includes instructions that, when executed by one or more computers, cause the one or more computers to perform operations, the operations comprising: generating graphical data for displaying a virtual reality user interface that includes a 3D virtual reality video that is illustrated as being inside a sphere, determining, based on movement of a peripheral device, that a user selects the sphere in the virtual reality user interface and the user moves the sphere on a head of the user; and displaying the 3D virtual reality video in the sphere surrounding the head of the user such that the user views a 360 degree environment corresponding to the 3D virtual reality video.

In some embodiments, the operations further comprise: determining, based on movement of the peripheral device, that the user moves the sphere closer to the head of the user and increasing a size of the sphere as the user moves the sphere closer to the head of the user. In some embodiments, wherein the operations further comprise: responsive to displaying the 3D virtual reality in the sphere surrounding the head of the user, removing an edge of the sphere such that the sphere is invisible to the user, detecting, based on movement of the peripheral device, that a hand of the user is less than a threshold distance from the head of the user, and responsive to the hand of the user being less than the threshold distance from the head of the user, displaying an edge of the sphere. In some embodiments, the operations further comprise: detecting, based on movement of the peripheral device, that the user removes the sphere from the head of the user by grabbing along the edge of the sphere and displaying the 3D virtual reality video as part of the sphere and thereby no longer surrounding the head of the user. In some embodiments, the operations further comprise: determining, based on movement of the peripheral device, that the user removes the sphere from the head of the user, displaying the sphere as moving away from the head of the user, receiving, from the peripheral device, data describing a rotation of the sphere, and displaying the sphere as being rotated including updating a viewing direction that corresponds to a location within the 3D virtual reality video that is displayed within the sphere. In some embodiments, the operations further comprise: receiving a selection of the sphere in a rotated position from the user and displaying the 3D virtual reality video as surrounding the user in the location that corresponds to the rotated position.

Other aspects include corresponding methods, systems, apparatus, and computer program products for these and other innovative aspects.

The disclosure is particularly advantageous in a number of respects. First, the virtual reality application provides an object, such as a sphere, that displays a three-dimensional preview of a three-dimensional virtual reality video that the user can use to view the content and enter three-dimensional virtual reality video. The user can also use the object to select a different location within the three-dimensional virtual reality video, thereby reducing instances of nausea by selecting a more particular location where the user wants to be within the three-dimensional virtual reality video. Lastly, the virtual reality application can determine a viewing direction based on the selected location and render the three-dimensional virtual reality video for that viewing direction with a higher bandwidth than other areas of the three-dimensional virtual reality video where the user is not looking to reduce the bandwidth requirements and improve the ability to stream the three-dimensional virtual reality video.

BRIEF DESCRIPTION OF THE DRAWINGS

FIG. 8 illustrates an example flow diagram for generating an object for viewing a three-dimensional preview of a three-dimensional virtual reality video according to some embodiments.

FIG. 9 illustrates an example flow diagram for using a sphere to view three-dimensional virtual reality video and reorient the user's location within the three-dimensional virtual reality video.

DESCRIPTION OF EMBODIMENTS

Example System

Figure 1:
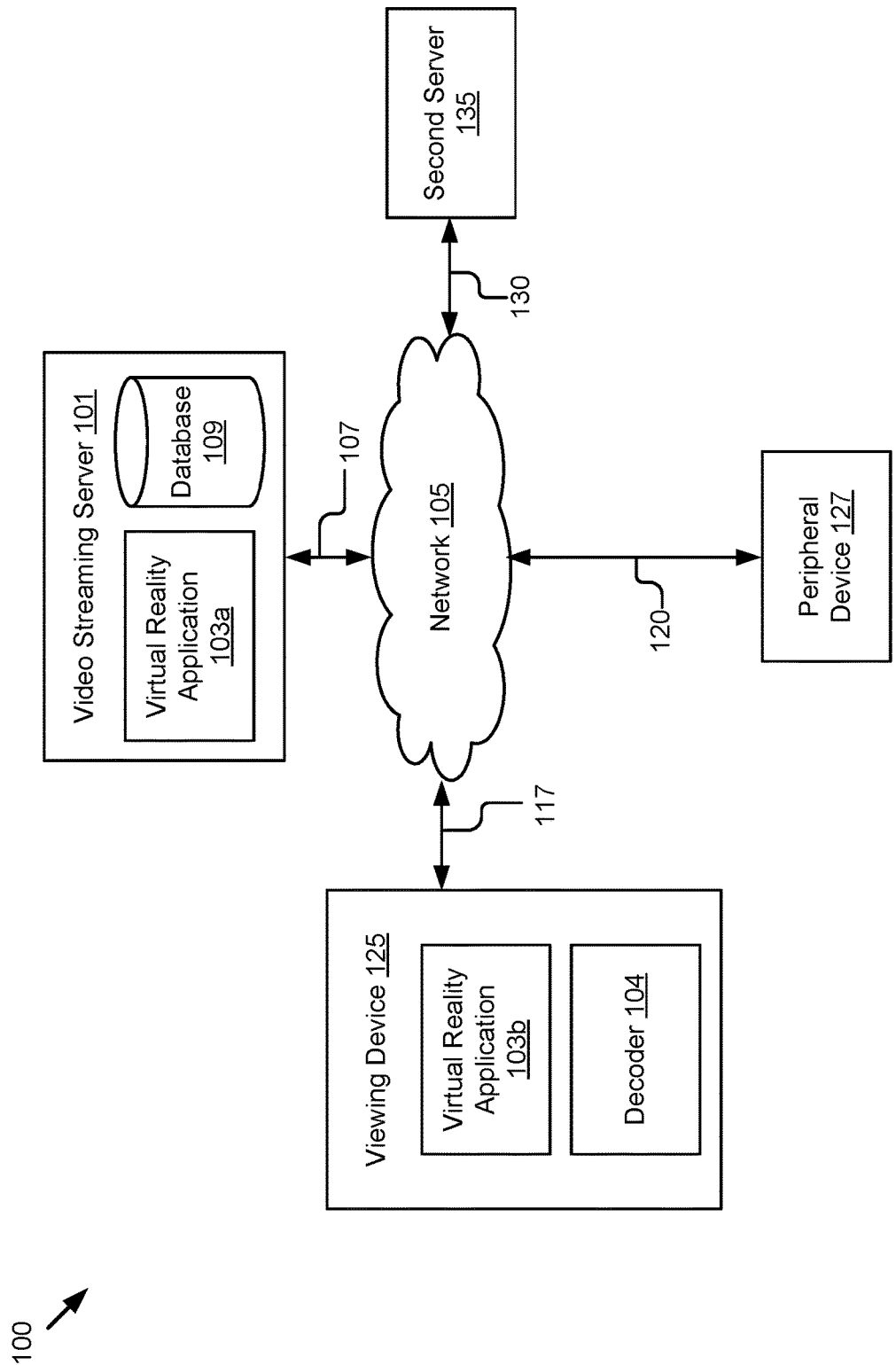
FIG. 1 illustrates an example virtual reality system that generates three-dimensional virtual reality videos and user interfaces according to some embodiments.

FIG. 1 illustrates an example virtual reality system 100 that generates three-dimensional virtual reality videos and user interfaces. The virtual reality system 100 comprises a video streaming server 101, a viewing device 125, a peripheral device 127, a second server 135, and a network 105.

While FIG. 1 illustrates one video streaming server 101, one viewing device 125, one peripheral device 127, and one second server 135, the disclosure applies to a system architecture having one or more video streaming servers 101, one or more viewing devices 125, one or more peripheral devices 127, and one or more second servers 135. Furthermore, although FIG. 1 illustrates one network 105 coupled to the entities of the system 100, in practice one or more networks 105 may be connected to these entities and the one or more networks 105 may be of various and different types.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth™ communication networks or a cellular communication network for sending and receiving data including via short messaging service (SMS), multimedia messaging service (MMS), hypertext transfer protocol (HTTP), direct data connection, wireless access protocol (WAP), e-mail, etc.

The video streaming server 101 may be a hardware server that includes a processor, a memory, a database 109, and network communication capabilities. The video streaming server 101 may also include a virtual reality application 103a. In some embodiments, the virtual reality application 103a can be implemented using hardware including a field-programmable gate array ("FPGA") or an application-specific integrated circuit ("ASIC"). In some other embodiments, the virtual reality application 103a may be implemented using a combination of hardware and software. The video streaming server 101 may communicate with the network 105 via signal line 107.

The virtual reality application 103a may receive images of a three-dimensional environment from a camera array or a second server 135 and generate a three-dimensional virtual reality video based on the image frames. In some embodiments, the virtual reality application 103a generates a user interface for navigating between different three-dimensional virtual reality videos. The database 109 may store the three-dimensional virtual reality videos and graphical data for generating the user interface.

The viewing device 125 may be a processor-based computing device. For example, the viewing device 125 may be a personal computer, laptop, mobile device, tablet computing device, smartphone, set top box, network-enabled television, or any other processor based computing device. In some embodiments, the viewing device 125 includes network functionality and is communicatively coupled to the network 105 via a signal line 117. The viewing device 125 may be configured to transmit data to the video streaming server 101 or to receive data from the video streaming server 101 via the network 105. A user may access the viewing device 125.

The viewing device 125 may includes a virtual reality application 103b. In some embodiments, the virtual reality application 103b receives the three-dimensional virtual reality video from the video streaming server 101 and decodes the three-dimensional virtual reality video and display a decoded video stream. For example, the virtual reality application 103b may decode the three-dimensional virtual reality video and determine a region of interest within the three-dimensional virtual reality video that is displayed at a higher resolution than the areas that are not regions of interest.

The viewing device 125 may be operable to display the decoded video stream. The viewing device 125 may include or use a computing device to render the video stream for the three-dimensional virtual reality videos and user interface on a virtual reality display device (e.g., Oculus Rift virtual reality display) or other suitable display devices that include, but are not limited to: headsets; augmented reality glasses; televisions, smartphones, tablets, or other devices with three-dimensional displays and/or position tracking sensors; and display devices with a viewing position control, etc. The viewing device 125 may also render a stream of three-dimensional audio data on an audio reproduction device (e.g., a headphone or other suitable speaker devices). The viewing device 125 may include the virtual reality display configured to render the three-dimensional virtual reality videos and user interface and the audio reproduction device configured to render the three-dimensional audio data. An end user may interact with the viewing device 125.

The viewing device 125 may track a head orientation of the end user while the end user is viewing the decoded video stream. For example, the viewing device 125 may include one or more accelerometers or gyroscopes used to detect a change in the end user's head orientation. The viewing device 125 may render the video stream of a three-dimensional virtual reality video on a virtual reality display device based on the viewing direction of the end user. As the end user changes his or her head orientation, the viewing device 125 may adjust the rendering of the decoded video stream based on the changes of the viewing direction of the end user. The viewing device 125 may log head-tracking data and transmit the head-tracking data to the virtual reality application 103b. Although not illustrated, in some embodiments the viewing device 125 may include some or all of the components of the virtual reality application 103a described below.

The peripheral device 127 may be a hardware controller for enabling a user to interact with the user interface and the three-dimensional virtual reality video. For example, the peripheral device 127 may include virtual reality gloves, a joystick, touch controllers (e.g., Oculus Touch), a mouse, a motion sensor/controller that detects hand movements (or other body part movements) and interprets the hand movements (or other body part movements) as actions, etc. The peripheral device 127 is coupled to the network 105 via signal line 120.

The second server 135 may be a hardware server that includes a processor, a memory, a database, and network communication capabilities. In the illustrated embodiment, the second server 135 is coupled to the network 105 via signal line 130. The second server 135 sends and receives data to and from one or more of the other entities of the system 100 via the network 105. For example, the second server 135 generates a three-dimensional virtual reality video and transmits the three-dimensional virtual reality video to the video streaming server 101. The second server 135 may include a virtual reality application that receives video data and audio data from a camera array and aggregates the video data to generate the three-dimensional virtual reality video.

Example Video Streaming Server 101

Figure 2:
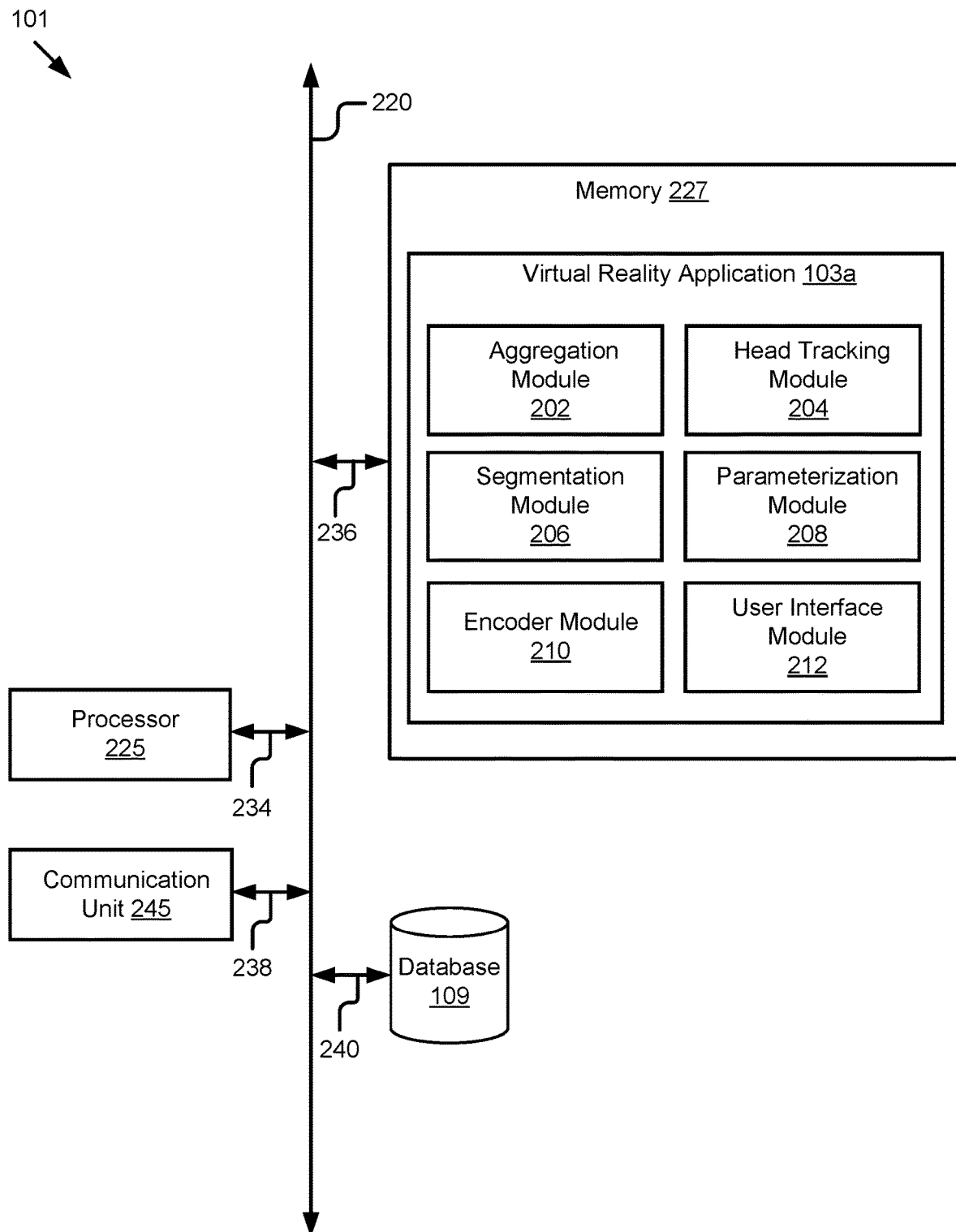
FIG. 2 illustrates an example video streaming server that generates three-dimensional virtual reality videos according to some embodiments.

FIG. 2 illustrates an example video streaming server 101 that generates three-dimensional virtual reality videos according to some embodiments. In some embodiments, the video streaming server 101 may include a special-purpose computing device configured to provide some or all of the functionality described below with reference to FIGS. 4A-10.

FIG. 2 may include a processor 225, a memory 227, a communication unit 245, and a database 109. The processor 225, the memory 227, the communication unit 245, and the database 109 are communicatively coupled to the bus 220. Other hardware components may be part of the video streaming server 101, such as sensors (e.g., a gyroscope, accelerometer), etc.

The processor 225 may include an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. Other processors, operating systems, sensors, displays, and physical configurations may be possible. The processor 225 is coupled to the bus 220 for communication with the other components via signal line 234.

The memory 227 stores instructions or data that may be executed by the processor 225. The instructions or data may include code for performing the techniques described herein. For example, the memory 227 may store the virtual reality application 103a, which may be a series of modules that include instructions or data for generating three-dimensional videos.

The memory 227 may include a dynamic random access memory (DRAM) device, a static random access memory (SRAM) device, flash memory, or some other memory device. In some embodiments, the memory 227 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 236.

The communication unit 245 includes hardware that may transmit and receive data to and from the viewing device 125, the peripheral device 127, the second server 135, and any other components that are not illustrated in FIG. 1, such as a camera array. The communication unit 245 is coupled to the bus 220 via signal line 238. In some embodiments, the communication unit 245 includes one or more ports for direct physical connection to the network 105 or another communication channel. For example, the communication unit 245 includes a USB, SD, CAT-5, or similar port for wired communication with the video streaming server 101. In some embodiments, the communication unit 245 includes a wireless transceiver for exchanging data with the video streaming server 101 or other communication channels using one or more wireless communication methods, including IEEE 802.11, IEEE 802.16, Bluetooth®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The database 109 may include hardware for storing data, such as three-dimensional virtual reality videos and graphical data for generating the user interface. The database 109 is coupled to the bus 220 via signal line 240.

The virtual reality application 103a may include an aggregation module 202, a head tracking module 204, a segmentation module 206, a parameterization module 208, an encoder module 210, and a user interface module 212. Although the modules are illustrated as being part of the same video streaming server 101, in some embodiments some of the modules are stored on the video streaming server 101 and some of the modules are stored on the viewing device 125. For example, the video streaming server 101 may include the head tracking module 204, the segmentation module 206, the parameterization module, and the encoder module 210 and the viewing device 125 may include the user interface module 212.

The aggregation module 202 may include code and routines for aggregating video data. In some embodiments, the aggregation module 202 includes a set of instructions executable by the processor 225 to aggregate video data. In some embodiments, the aggregation module 202 is stored in the memory 227 of the video streaming server 101 and is accessible and executable by the processor 225. In some embodiments, the aggregation module 202 may be part of a separate application.

The aggregation module 202 may receive video data from the camera array. In some embodiments, the video data includes separate video recordings for each camera module included in the camera array and a device identifier (ID) that identifies the camera module corresponding to each separate video recording.

A two-dimensional (2D) spherical panoramic image may be used to represent a panorama of an entire scene. The aggregation module 202 may generate two stereoscopic panorama images for two eyes to provide a stereoscopic view of the entire scene. For example, a left panoramic image may be generated for the left eye viewing and a right panoramic image may be generated for the right eye viewing.

A pixel in a panoramic image may be represented by a yaw value and a pitch value. Yaw represents rotation around the center and may be represented on the horizontal x-axis as: yaw=360°×x/width. Yaw has a value between 0° and 360°. Pitch represents up or down rotation and may be represented on the vertical y-axis as: pitch=90°×(height/2-y)/(height/2). Pitch has a value between −90° and 90°.

Typical stereoscopic systems (e.g., three-dimensional movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at an x position with pitch=0° in a left panoramic image may represent an eye viewing position of the left eye as the head is rotated by the yaw indicated by the x position. Similarly, a pixel at an x position with pitch=0° in a right panoramic image represents an eye viewing position of the right eye as the head is rotated by the yaw indicated by the x position. For pitch=0° (e.g., no up and down rotations), as the head is rotated from x=0 to x=width, a blended panorama for eye viewing positions with all 360-degree head rotations in the horizontal axis may be produced.

In some implementations, the blended panorama is effective for head rotations along the horizontal axis (e.g., yaw) but not for the vertical axis (e.g., pitch). For example, when a user looks upward, the quality of the stereo view may degrade. In order to correct this deficiency, the interocular distance may be adjusted based on the current pitch value. For example, if pitch≠0°, the interocular distance associated with the pitch may be adjusted as: interocular distance=max (interocular distance)×cos(pitch), where max(interocular distance) represents the maximum value of the interocular distance (e.g., the interocular distance is at its maximum when pitch=0°). In some examples, the maximum value of the interocular distance may be about 60 millimeters. In other examples, the maximum value of the interocular distance may have a value greater than 60 millimeters or less than 60 millimeters.

The aggregation module 202 may construct a left camera mapping map for each pixel in a left panoramic image. For example, for a pixel in a left panoramic image that represents a point in a panorama, the left camera mapping map may identify matching camera modules from a camera array with spherical modules that have each a better view for the point in the panorama than other camera modules. Thus, the left camera mapping map may map pixels in a left panoramic image to matching camera modules that have better views for the corresponding pixels.

For each pixel in a left panoramic image that represents a point in a panorama, the aggregation module 202 may determine a yaw, a pitch, and an interocular distance using the above mathematical expressions (1), (2), and (3), respectively. The aggregation module 202 may use the yaw and pitch to construct a vector representing a viewing direction of the left eye (e.g., a left viewing direction) to the corresponding point in the panorama.

Similarly, the aggregation module 202 may construct a right camera mapping map that identifies a corresponding matching camera module for each pixel in a right panoramic image. For example, for a pixel in a right panoramic image that represents a point in a panorama, the right camera mapping map may identify a matching camera module that has a better view for the point in the panorama than other camera modules. Thus, the right camera mapping map may map pixels in a right panoramic image to matching camera modules that have better views for the corresponding pixels.

For each pixel in a right panoramic image that represents a point in a panorama, the aggregation module 202 may determine a yaw, a pitch, and an interocular distance using the above mathematical expressions, respectively. The aggregation module 202 may use the yaw and pitch to construct a vector representing a viewing direction of the right eye (e.g., a right viewing direction) to the corresponding point in the panorama.

The aggregation module 202 may receive video recordings that describe image frames from the various camera modules in a camera array. The aggregation module 202 identifies a location and timing associated with each of the camera modules and synchronizes the image frames based on locations and timings of the camera modules. The aggregation module 202 synchronizes image frames captured by different camera modules at the same time frames.

For example, the aggregation module 202 receives a first video recording with first images from a first camera module and a second video recording with second images from a second camera module. The aggregation module 202 identifies that the first camera module is located at a position with yaw=0° and pitch=0° and the second camera module is located at a position with yaw=30° and pitch=0°. The aggregation module 202 synchronizes the first images with the second images by associating a first image frame from the first images at a time frame $T=T_0$ with a second image frame from the second images at the time frame $T=T_0$, a third image frame from the first images at a time frame $T=T_1$ with a fourth image frame from the second images at the time frame $T=T_1$, and so on and so forth.

The aggregation module 202 may construct a stream of left panoramic images from the image frames based on the left camera mapping map. For example, the aggregation module 202 identifies matching camera modules listed in the left camera mapping map. The aggregation module 202 constructs a first left panoramic image $PI_{L,0}$ for a first time frame $T=T_0$ by stitching together image frames captured at the first time frame $T=T_0$ by the matching camera modules. The aggregation module 202 constructs a second left panoramic image $PI_{L,1}$ at a second time frame $T=T_1$ using image frames captured at the second time frame $T=T_1$ by the matching camera modules, and so on and so forth. The aggregation module 202 constructs the stream of left panoramic images to include the first left panoramic image $PI_{L,0}$ at the first time frame $T=T_0$, the second left panoramic image $PI_{L,1}$ at the second time frame $T=T_1$, and other left panoramic images at other corresponding time frames.

Specifically, for a pixel in a left panoramic image $PI_{L,i}$ at a particular time frame $T=T_i$ (i=0, 1, 2, . . . ), the aggregation module 202: (1) identifies a matching camera module from the left camera mapping map; and (2) configures the pixel in the left panoramic image $PI_{L,i}$ to be a corresponding pixel from an image frame captured by the matching camera module at the same time frame $T=T_i$. The pixel in the left panoramic image $PI_{L,i}$ and the corresponding pixel in the image frame of the matching camera module may correspond to the same point in the panorama. For example, for a pixel location in the left panoramic image $PI_{L,i}$ that corresponds to a point in the panorama, the aggregation module 202: (1) retrieves a pixel that also corresponds to the same point in the panorama from the image frame captured by the matching camera module at the same time frame $T=T_i$; and (2) places the pixel from the image frame of the matching camera module into the pixel location of the left panoramic image $PI_{L,i}$.

Similarly, the aggregation module 202 constructs a stream of right panoramic images from the image frames based on the right camera mapping map by performing operations similar to those described above with reference to the construction of the stream of left panoramic images. For example, the aggregation module 202 identifies matching camera modules listed in the right camera mapping map. The aggregation module 202 constructs a first right panoramic image $PI_{R,0}$ for a first time frame $T=T_0$ by stitching together image frames captured at the first time frame $T=T_0$ by the matching camera modules. The aggregation module 202 constructs a second right panoramic image $PI_{R,1}$ at a second time frame $T=T_1$ using image frames captured at the second time frame $T=T_1$ by the matching camera modules, and so on and so forth. The aggregation module 202 constructs the stream of right panoramic images to include the first right panoramic image $PI_{R,0}$ at the first time frame $T=T_0$, the second right panoramic image $PI_{R,1}$ at the second time frame $T=T_1$, and other right panoramic images at other corresponding time frames.

Specifically, for a pixel in a right panoramic image $PI_{R,i}$ at a particular time frame $T=T_i$ (i=0, 1, 2, . . . ), the aggregation module 202: (1) identifies a matching camera module from the right camera mapping map; and (2) configures the pixel in the right panoramic image $PI_{R,i}$ to be a corresponding pixel from an image frame captured by the matching camera module at the same time frame $T=T_i$. The pixel in the right panoramic image $PI_{R,i}$ and the corresponding pixel in the image frame of the matching camera module may correspond to the same point in the panorama.

The aggregation module 202 may obtain virtual reality content from the stream of left panoramic images, the stream of right panoramic images, and the audio data by sending one or more of the stream of left panoramic images, the stream of right panoramic images, and the audio data to the encoder module 210 for encoding. The encoder module 210 may compress the stream of left panoramic images and the stream of right panoramic images to generate a stream of compressed three-dimensional video data using video compression techniques. In some implementations, within each stream of the left or right panoramic images, the encoder module 210 may use redundant information from one frame to a next frame to reduce the size of the corresponding stream. For example, with reference to a first image frame (e.g., a reference frame), redundant information in the next image frames may be removed to reduce the size of the next image frames. This compression may be referred to as temporal or inter-frame compression within the same stream of left or right panoramic images.

Alternatively or additionally, the encoder module 210 may use one stream (either the stream of left panoramic images or the stream of right panoramic images) as a reference stream and may compress the other stream based on the reference stream. This compression may be referred to as inter-stream compression. For example, the encoder module 210 may use each left panoramic image as a reference frame for a corresponding right panoramic image and may compress the corresponding right panoramic image based on the referenced left panoramic image. The encoding process is discussed in greater detail below with reference to the encoder module 210. Once the encoder module 210 completes the encoding process, the aggregation module 202 may transmit, via the communication unit 245, the three-dimensional video to the viewing device 125.

The head tracking module 204 may include code and routines for receiving head tracking data and generating a probabilistic model. In some embodiments, the head tracking module 204 includes a set of instructions executable by the processor 225 to receive head tracking data and generate the probabilistic model. In some embodiments, the head tracking module 204 is stored in the memory 227 of the video streaming server 101 and is accessible and executable by the processor 225.

The head tracking module 204 may receive head tracking data from the viewing device 125 that corresponds to a three-dimensional video. The head tracking data may describe a person's head movement as the person watches the three-dimensional video. For example, the head tracking data may reflect that a person moved her head up and to the right to look at an image of a squirrel in a tree. In some embodiments, the head tracking data includes yaw (i.e., rotation around a vertical axis), pitch (i.e., rotation around a side-to-side axis), and roll (i.e., rotation around a front-to-back axis) for a person as a function of time that corresponds to the three-dimensional video. In some implementations, the head tracking module 204 determines a head-mounted display position for each person at a particular frequency, such as 10 Hz throughout the three-dimensional video.

In some embodiments, the head tracking module 204 generates user profiles based on the head tracking data. For example, the head tracking module 204 may aggregate head tracking data from multiple people and organize it according to a first most common region of interest in the three-dimensional video, a second most common region of interest in the three-dimensional video, and a third most common region of interest in the three-dimensional video. In some embodiments, the head tracking module 204 may generate user profiles based on demographic information corresponding to the people. For example, the head tracking module 204 may generate a user profile based on age, gender, etc. In some embodiments, the head tracking module 204 may generate a user profile based on physical characteristics. For example, the head tracking module 204 may identify people that move frequently while viewing the three-dimensional video and people that move very little. In some embodiments, the head tracking module 204 generates a user profile for a particular user.

The head tracking module 204 generates a probabilistic model of one or more positions of people that view a three-dimensional video. The probabilistic model identifies a probability of a viewer looking in a particular direction as a function of time. For example, the probabilistic model identifies that a viewer will likely look at a particular object as it moves in the three-dimensional video and that the viewer is unlikely to look direction behind the current location where the viewer is looking.

The head tracking module 204 may generate the probabilistic model on a pixel-by-pixel basis, based on regions in the view, such as a field-of-view, equal-sized divisions of the sphere, etc.

The probabilistic model may include a heat map. For example, the heat map may be rendered as a sequence of false-colored images. In some embodiments, the probabilistic model is displayed as an overlay on top of the three-dimensional video. In some embodiments, the probabilistic model is not displayed but is instead used by the encoder module 210 as described below.

In some embodiments, the parameterization module 208 uses the probabilistic model to determine where one or more people are looking. For example, analysis of one or more probabilistic models may indicate that people frequently look in particular direction when watching a given piece of virtual reality content. Subsequent people may benefit from this information since it may help them to know where they should be looking when watching the virtual reality content. The encoder module 210 may present recommendations to people about where they should be looking when viewing virtual reality content. The recommendations may be audio cues, visual cues or a combination of audio and visual cues. In some embodiments, the visual cues may include blurring every portion of the virtual reality content except for the recommended location where a viewer should be looking.

In some embodiments, the head tracking module 204 may use artificial intelligence to generate a set of probabilistic models from a set of three-dimensional videos. For example, the database 109 stored on the video streaming server 101 may include all three-dimensional videos offered by a company that generates virtual reality content. The head tracking module 204 may use head-tracking data from users that view those three-dimensional videos as a training set for generating the set of probabilistic models. The head tracking module 204 may include a neural network that is trained using the set of probabilistic models to determine a probabilistic distribution of viewer gaze.

In some embodiments, the artificial intelligence may be used iteratively, such that each time a new three-dimensional video is generated, the head tracking module 204 uses artificial intelligence (e.g., the neural network) to generate a probabilistic model for the new three-dimensional video. This advantageously results in the creation of probabilistic models for three-dimensional videos that have never been watched.

The segmentation module 206 may include code and routines for generating video segments from the three-dimensional video. In some embodiments, the segmentation module 206 includes a set of instructions executable by the processor 225 to generate the video segments. In some embodiments, the segmentation module 206 is stored in the memory 227 of the video streaming server 101 and is accessible and executable by the processor 225.

The segmentation module 206 generates video segments from the three-dimensional video. In some embodiments, the segmentation module 206 generates equal-length video segments of a predetermined length. For example, the segmentation module 206 divides a three-minute three-dimensional video into 360 two-second segments. In some embodiments, the segmentation module 206 detects scene boundaries in the three-dimensional video and segments the three-dimensional video based on the scene boundaries. For example, the segmentation module 206 compares a first frame to a next frame to identify differences that indicate a transition between shots. When the segmentation module 206 detects the transition between shots, the segmentation module 206 generates a segment that includes the shot. In some embodiments, the segmentation module 206 may generate segments using a combination of detection of scene boundaries and timing. For example, the segmentation module 206 may first segment the three-dimensional video based on transitions between shots and further segment if any shots exceed a predetermined length of time, such as five seconds.

The parameterization module 208 may include code and routines for generating optimal segment parameters. In some embodiments, the parameterization module 208 includes a set of instructions executable by the processor 225 to generate the optimal segment parameters. In some embodiments, the parameterization module 208 is stored in the memory 227 of the video streaming server 101 and is accessible and executable by the processor 225.

Three-dimensional video is viewable in all directions. Thus, the three-dimensional video may be modeled by a sphere where a user is in the center of the sphere and may view content from the three-dimensional video in any direction. In some embodiments, the parameterization module 208 converts the locations on the surface of the sphere into a plane. For example, the parameterization module 208 may use a map projection to transform the latitudes and longitudes of locations on the surface of the sphere into locations on a plane. In some embodiments, for each of the video segments, the parameterization module 208 determines a directional encoding format (i.e., a map projection) that projects latitudes and longitudes of locations of the surface of the sphere into locations on the plane. The directional encoding format, i.e., the projection of the latitudes and longitudes of locations of the surface of the sphere may be represented by the following equation:

$$f(\text{yaw},\text{pitch},\text{roll},\text{parameters}) \rightarrow \text{resolution} \qquad \text{Eq. (1a)}$$

where the yaw, pitch, and roll values are obtained from the head-tracking data and/or the probabilistic model. Specifically, the yaw, pitch, and roll values describes a position of a person that is viewing the three-dimensional video as a function of time. The yaw, pitch, and roll values may include head-tracking data that is aggregated for multiple people that view the three-dimensional video. The parameters represent a location in the plane and the resolution is the resolution of the three-dimensional video at a region that corresponds to the yaw, pitch, and roll values.

In some embodiments, the directional encoding format may be represented by the following equation:

$$f(\text{parameters}(\text{pitch},\text{yaw})) \rightarrow \text{resolution} \qquad \text{Eq. (1b)}$$

The parameterization module 208 may design a cost function that gives a measure of perceived resolution (e.g., a geometric mean of horizontal and vertical pixels per degree at a display center) for a user gazing in a particular direction at a particular timestamp for a particular set of parameters for the projection. For example, where the latitude/longitude is 0 on the sphere, the particular set of parameters may indicate how biased the encoding is towards its high-resolution region. In some embodiments, the total cost function may be defined as a sum of the individual costs as a function of optimal segment parameters at a particular point in the three-dimensional video.

The parameterization module 208 may set a resolution threshold, such as 10 pixels per degree, that is display and bandwidth-target dependent. If f(parameters) is greater than the resolution threshold, there is no benefit and a cost function that incorporates hinge loss from machine learning may be represented by the following equation:

$$\text{cost}(\text{yaw},\text{pitch},\text{roll},\text{params}) = \max(10 - f(\text{yaw},\text{pitch},\text{roll}, \text{params}),0) \qquad \text{Eq. (2a)}$$

where params represents the optimal segment parameters. The parameterization module 208 uses the cost function to identify a region of interest on the plane based on the head-tracking data and/or the probabilistic model by minimizing a total cost for all users that viewed the three-dimensional video. Persons of ordinary skill in the art will recognize that other cost functions may be used. The parameterization module 208 may generate optimal segment parameters that minimize a sum-over position for the region of interest by applying the cost function. The optimal segment parameters may include a (yaw, pitch) tuple that encodes the region of interest in the video segment. In some embodiments, the parameterization module 208 determines one or more regions of low interest based on the probabilistic model. For example, a region of low interest may include a field-of-view or other division of a three-dimensional video based on the probabilistic model.

In some embodiments, the parameterization module 208 determines multiple directional encodings in each of the video segments for three-dimensional video to identify multiple regions of interest within the three-dimensional video. For example, the head tracking module 204 generates a first user profile and a second user profile and the parameterization module 208 generates first optimal segment parameters associated with the first user profile and second optimal segment parameters associated with the second user profile.

The parameterization module 208 may determine the multiple directional encodings using time-dependent clustering and/or a model that is similar to k-means clustering. The parameterization module 208 may determine n paths in the three-dimensional video where each path represents an independent set of parameters. If n>1, the cost function may be defined as:

$$\text{cost\_multi}(\text{yaw,pitch,roll,parameter\_sets}) = \max([\text{cost}(\text{yaw,pitch,roll,param\_set}) \text{ for param\_set in parameter\_sets}]) \qquad \text{Eq. (2b)}$$

In some embodiments, a new directional encoding format may be designed with multiple potential regions of interest. The new directional encoding format may be converted into the above resolution and cost functions.

The encoder module 210 may include code and routines for re-encoding the three-dimensional video. In some embodiments, the encoder module 210 includes a set of instructions executable by the processor 225 to re-encode the three-dimensional video. In some embodiments, the encoder module 210 is stored in the memory 227 of the video streaming server 101 and is accessible and executable by the processor 225.

The encoder module 210 may re-encode the three-dimensional video to include the optimal segment parameters for each of the video segments. For example, the encoder module 210 may re-encode the three-dimensional video by generating a re-encoded video that includes a high-resolution version of the region of interest and a lower resolution version of the other regions in the re-encoded video. The encoder module 210 may transmit, via the communication unit 245, the re-encoded video and the optimal segment parameters for each of the video segments to the viewing device 125.

In some embodiments, the encoder module 210 re-encodes the three-dimensional video by blurring portions of the three-dimensional video. The encoder module 210 may blur on a pixel-by-pixel basis according to a probability that the viewer is looking at a particular pixel based on the probabilistic model. Alternatively or additionally, the encoder module 210 may blur based on regions of interest or regions of low interest.

In some embodiments, the encoder module 210 blurs each of the video segments with varying intensity such that the intensity of a level of blur increases as the probability of a viewer looking in a particular direction decreases. For example, a video segment with a single moving object may include the region around the moving object optimized to include high resolution, the area surrounding the moving object including slightly lower resolution, the top and bottom of the video segment including significant blur etc.

In some embodiments, the encoder module 210 re-encodes the three-dimensional video to include optimal segment parameters for each of the video segments and/or blurs portions of each of the video segments responsive to a threshold number of people viewing the three-dimensional video. For example, if only two people viewed the three-dimensional video, the head-tracking data generated from those people viewing the three-dimensional video may be insufficient to reliably predict a probability of a viewer looking in a particular location.

The viewing device 125 may receive the re-encoded video and the optimal segment parameters for each of the video segments from the encoder module 210. The viewing device 125 may use the optimal segment parameters for each of the video segments to un-distort the re-encoded video and texture the re-encoded video to the sphere to display the re-encoded video with the region of interest for each of the video segments displayed at a higher resolution that other regions in each of the video segments.

In some embodiments, the encoder module 210 re-encodes the three-dimensional video to include different sets of optimal segment parameters. For example, the head track module 204 may generate a first user profile that reflects a most common region in each of the video segments and a second user profile that reflects a second most common region in each of the video segments. The parameterization module 208 may generate first optimal segment parameters associated with the first user profile and second optimal segment parameters associated with the second user profile. The encoder module 210 may re-encode the three-dimensional video to include the first optimal segment parameters and the second optimal segment parameters for each of the video segments. The encoder module 210 may provide the re-encoded video, the first optimal segment parameters for each of the video segments, and the second optimal segment parameters for each of the video segments to the viewing device 125. The viewing device 125 may un-distort the re-encoded video and texture the re-encoded video to the sphere to display the re-encoded video with two regions of interest for each of the video segments displayed at a higher resolution than other regions in each of the video segments.

In some embodiments, the head-track module 204 may generate multiple user profiles where different people were looking at the same region of interest for a particular video segment. For example, the head-track module 204 may generate different user profiles based on the age of the people that viewed the three-dimensional video. There may be instances where the people in the different age groups looked at the same object in the three-dimensional video because the object was moving fast, making a loud noise, etc. As a result, in some embodiments, the encoder module 210 may re-encode the three-dimensional video to include a single region of interest at a higher resolution than other regions of interest for a video segment even though the re-encoded video is based on multiple sets of segment parameters. In some embodiments where the head-track module 204 generates a user profile for a particular user, the encoder module 210 may re-encode the three-dimensional video for a user based on the user profile for the particular user.

In some embodiments, the encoder module 210 re-encodes the three-dimensional video for use as a two-dimensional video. For example, the encoder module 210 re-encodes the three-dimensional video to include the optimal segment parameters for each of the video segments and provides a re-encoded video and the optimal segment parameters for each of the video segments to the viewing device 125 or the viewing device 125. The viewing device 125 may be used for browser-based players that display the two-dimensional video, for example, on a computer screen. The viewing device 125 may be used, for example, when a user wants to switch from an interactive three-dimensional video to an autopilot mode that displays a two-dimensional video that does all the work for the user.

The viewing device 125 or the viewing device 125 may use the re-encoded video and the optimal segment parameters for each of the video segments to generate a two-dimensional video that automates head movement. The optimal segment parameters for each video segment provide a model for how a user moves while watching the three-dimensional video. The two-dimensional video may automate pitch and yaw movements to simulate the model based on the optimal segment parameters. This may advantageously allow users to view an autopilot mode that automates the three-dimensional movement without having to control the two-dimensional video themselves by using, for example, a mouse, joystick, keys, etc.

In some embodiments, the encoder module 210 generates the two-dimensional video from the three-dimensional video based on the optimal segment parameters. Because the optimal segment parameters for a video segment indicate a region of interest in the video segment, the encoder module 210 may generate a two-dimensional video that depicts head tracking movement as automatic panning within the two-dimensional video. For example, the encoder module 210 may convert a three-dimensional video that includes a bird flying overhead to a two-dimensional video where it appears as if the camera moves overhead to look at the bird, the way a person viewing the three-dimensional video would move. This may advantageously allow a person viewing content on his desktop computer to have a simulated virtual-reality experience.

The encoder module 210 may generate a two-dimensional video from the three-dimensional video that includes multiple optimal segment parameters. For example, the encoder module 210 may generate the two-dimensional video based on multiple user profiles created based on a first most common region of interest and a second most common region of interest, demographics information, etc.

The encoder module 210 may compress the three-dimensional video to generate a stream of compressed three-dimensional video data using video compression techniques. Because portions of the three-dimensional video may include blurring, the three-dimensional video may be more compressible than traditional three-dimensional videos. In some implementations, the aggregation module 202 may encode the stream of three-dimensional video data (or compressed three-dimensional video data) and audio data to form a stream of three-dimensional video. For example, the encoder module 210 may compress the stream of three-dimensional video data using h.264 and the stream of three-dimensional audio data using advanced audio coding (AAC). In another example, the encoder module 210 may compress the stream of three-dimensional video data and the stream of three-dimensional audio data using a standard MPEG format.

The user interface module 212 may include code and routines for generating a user interface. In some embodiments, the user interface module 212 includes a set of instructions executable by the processor 225 to generate the user interface. In some embodiments, the user interface module 212 is stored in the memory 227 of the video streaming server 101 and is accessible and executable by the processor 225.

In some embodiments, the user interface module 212 may generate a user interface that includes options for selecting a three-dimensional virtual reality video to view from a set of three-dimensional virtual reality videos. For example, the user interface may include options for using an object, such as a sphere, to view a three-dimensional preview of one of the three-dimensional virtual reality videos. The different types of user interfaces will be discussed in greater detail below with reference to the user interface module 306 of the viewing device 125. Persons of ordinary skill in the art will recognize that the user interface could be generated by either the user interface module 212 of the video streaming server 101 or the user interface module 306 of the viewing device 125.

Example Viewing Device 125

Figure 3:
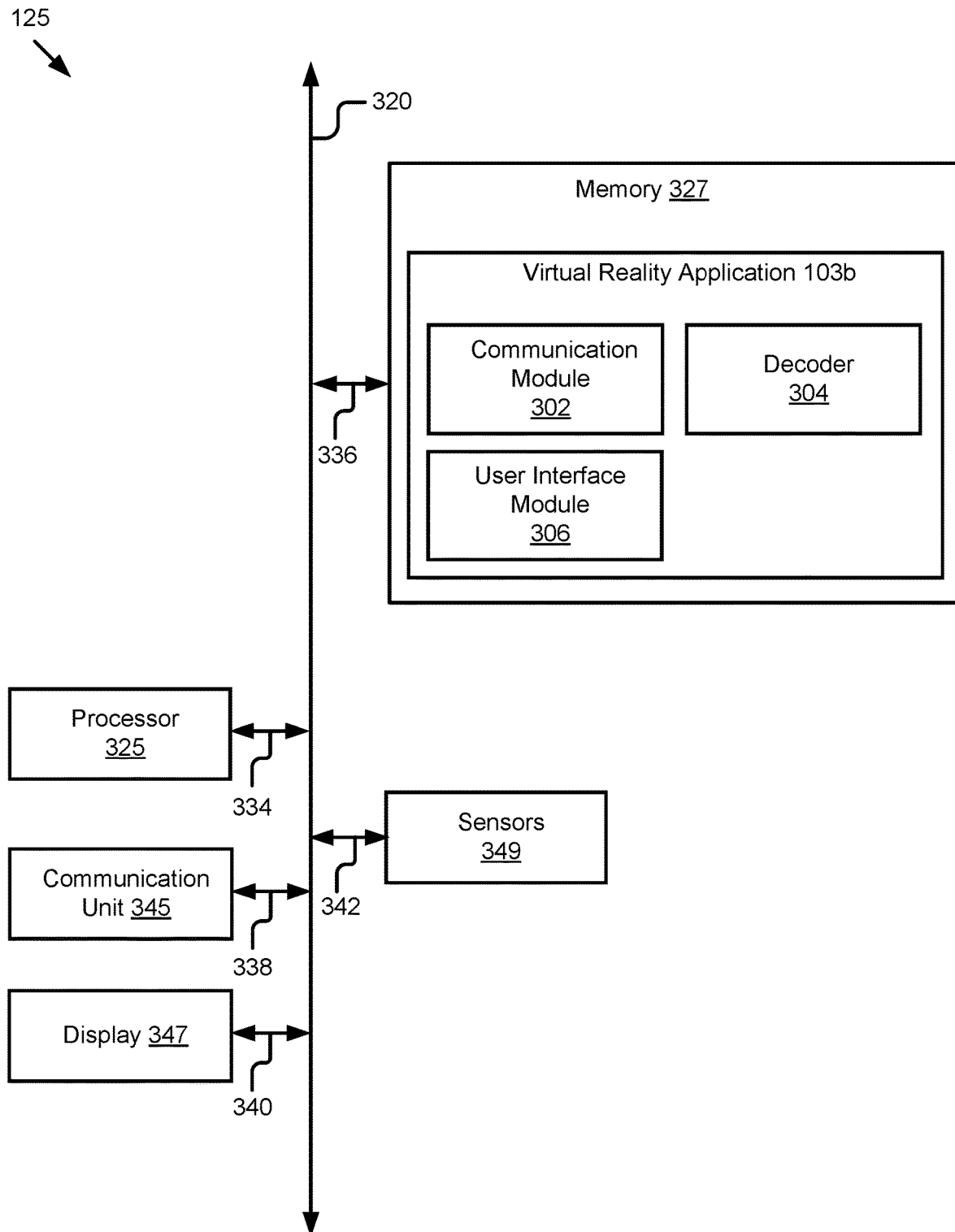
FIG. 3 illustrates an example viewing device according to some embodiments.

FIG. 3 illustrates an example viewing device 125. In some embodiments, the FIG. 3 illustrates an example viewing device 125 may include a special-purpose computing device configured to provide some or all of the functionality described below with reference to FIGS. 4A-10.

FIG. 3 may include a processor 325 that is coupled to the bus 320 via signal line 334, a memory 327 coupled to the bus 320 via signal line 336, a communication unit 345 that is coupled to the bus 320 via signal line 338, a display 347, that is coupled to the bus 320 via signal line 340, and sensors that are coupled to the bus 320 via signal line 342. Other hardware components may be part of the viewing device 125. Because a memory 227, a processor 225, and a communication unit 245 were described with reference to FIG. 2, they will not be described separately here. The memory 327 stores a virtual reality application 103*b*.

The display 347 may include hardware for displaying graphical data related to the virtual reality application 103*b* and the decoder 104. For example, the display 347 displays a user interface for selecting a three-dimensional virtual reality video to be displayed by the viewing device 125. The display 347 is coupled to the bus 320 via signal line 340.

The display 347 may also include a virtual reality display device that renders the video stream for the three-dimensional virtual reality videos. For example, the display 347 may include an Oculus Rift virtual reality display; headsets; augmented reality glasses; televisions, smartphones, tablets, or other devices with three-dimensional displays and/or position tracking sensors; and display devices with a viewing position control, etc.

The display 347 may also include hardware for rendering a stream of three-dimensional audio data on an audio reproduction device (e.g., a headphone or other suitable speaker devices).

The sensors 349 may include hardware that is operable to track a viewing direction of the user. For example, the sensors 349 may include a gyroscope and an accelerometer. The sensors 349 may generate sensor data that describes a location of a user while the viewer is viewing three-dimensional virtual reality videos. For example, the sensor data may include a description of yaw (i.e., rotation around a vertical axis), pitch (i.e., rotation around a side-to-side axis), and roll (i.e., rotation around a front-to-back axis).

The virtual reality application 103*b* includes a communication module 302, a decoder 304, and a user interface module 306.

The communication module 302 may include code and routines for managing data. In some embodiments, the communication module 302 includes a set of instructions executable by the processor 325 to manage data. In some embodiments, the communication module 302 is stored in the memory 327 of the viewing device 125 and is accessible and executable by the processor 325.

In some embodiments, the communication module 302 manages communications between components of the viewing device. For example, the communication module 302 receives a viewing direction of an end user from the sensors 349 via the communication unit 345. The viewing direction describes the position of the end user's head while viewing the three-dimensional virtual reality video. For example, the viewing direction may include a description of yaw (i.e., rotation around a vertical axis), pitch (i.e., rotation around a side-to-side axis), and roll (i.e., rotation around a front-to-back axis). The communication module 302 may receive the viewing direction from the sensors 349 periodically (e.g., every one second, every millisecond, etc.) or each time there is a change in the position of the end user's head.

In some embodiments, the communication module 302 manages communications between components of the virtual reality application 103b. For example, the communication module 302 may receive a three-dimensional virtual reality video via the communication unit 345. The communication module 302 may transmit the three-dimensional virtual reality video for decoding. The communication module 302 may also transmit the sensor data describing a viewing direction to the decoder 304 so that the decoder can decode an encoded three-dimensional virtual reality video based on the viewing direction.

The decoder 304 may include code and routines for decoding an encoded three-dimensional virtual reality video. In some embodiments, the decoder 304 includes a set of instructions executable by the processor 325 to decode the three-dimensional virtual reality video. In some embodiments, the decoder 304 is stored in the memory 327 of the viewing device 125 and is accessible and executable by the processor 325.

The decoder 304 may receive an encoded three-dimensional virtual reality video from the communication module 302 and decode and render a stream of three-dimensional video data on the display 347. In some embodiments, the three-dimensional virtual reality video is decoded and rendered based on a viewing direction of the end user. For example, the decoder 304 may prioritize the viewing direction by rendering pixels within the region of interest as described by the viewing direction with a higher resolution than areas within the three-dimensional virtual reality video where the user is not looking. The viewing direction may be based on receiving sensor data from the sensors 349 via the communication module 302 while the user is viewing the three-dimensional virtual reality video.

In some embodiments, the decoder 304 may decode and render a three-dimensional virtual reality video based on a viewing direction as determined by the location a user enters the three-dimensional virtual reality video when the user selects the three-dimensional virtual reality video using an object such as a sphere in the user interface. For example, the user may select a location within the sphere for entering the three-dimensional virtual reality video and then enter the video, for example, by placing the sphere on the head of the user. The decoder 304 may determine the viewing direction based on the selected location. The viewing direction may be rendered with a higher resolution than other areas within the three-dimensional virtual reality video where the user is not looking. This advantageously reduces the bandwidth of the three-dimensional virtual reality video and makes it easier and faster to stream the content to the user.

In some embodiments where the user repositions a sphere to select a new location, the decoder 304 may update the viewing direction that corresponds to a location within the three-dimensional virtual reality video that is displayed within the sphere. As a result, the decoder 304 may render the updated viewing direction at a higher resolution than other areas within the three-dimensional virtual reality video where the user is not looking.

The user interface module 306 may include code and routines for generating a user interface. In some embodiments, the user interface module 306 includes a set of instructions executable by the processor 325 to generate the user interface. In some embodiments, the user interface module 306 is stored in the memory 327 of the viewing device 125 and is accessible and executable by the processor 325.

Figure 4A:
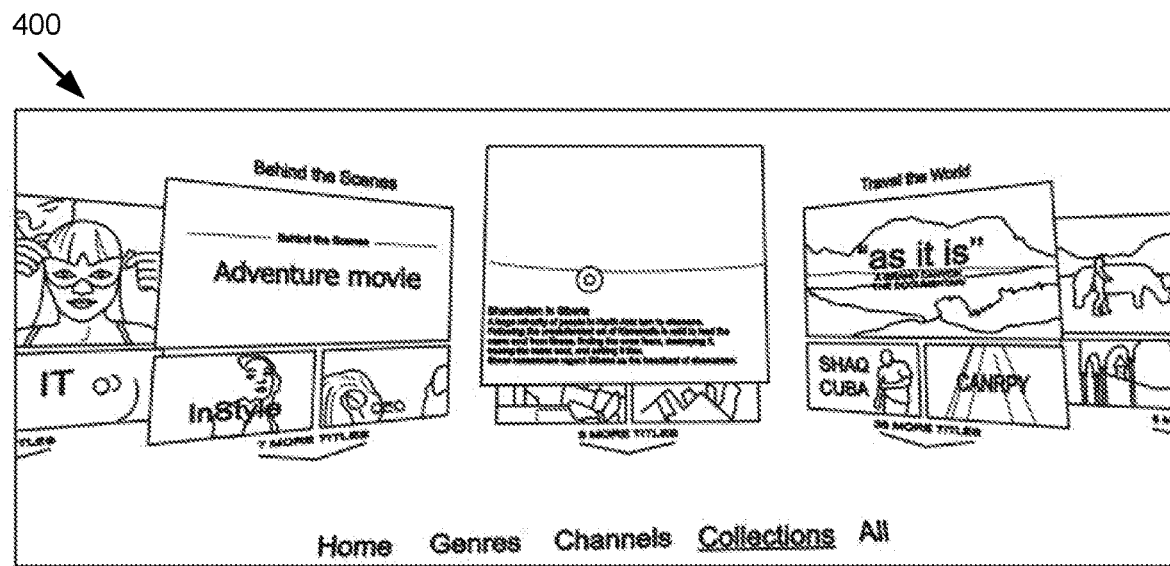
FIG. 4A illustrates an example user interface with selectable icons that correspond to a set of three-dimensional virtual reality videos according to some embodiments.

The user interface module 306 generates a virtual reality user interface that includes selectable icons that correspond to a set of three-dimensional virtual reality videos. FIG. 4A illustrates an example user interface 400 with selectable icons that correspond to a set of three-dimensional virtual reality videos according to some embodiments. In some embodiments, such as the embodiment illustrated in FIG. 4A, the selectable icons display two-dimensional versions of the three-dimensional virtual reality videos.

In this example, the set of three-dimensional virtual reality videos are divided into different collections. For example, the "Behind the Scenes" category includes three-dimensional virtual reality videos that describe how videos were produced. In another example, the "Travel the World" category includes three-dimensional virtual reality videos of different locations in the world. The user interface 400 includes other ways to organize the set of three-dimensional virtual reality videos. Specifically, a user may use a peripheral device 127 to view the three-dimensional virtual reality videos organized as genres, channels, a set with no organization, or the user may select to move to the home menu.

The user interface module 306 generates a virtual reality user interface that includes an object that can be moved in front of selectable icons that correspond to a set of three-dimensional virtual reality videos in order to view a three-dimensional version of a virtual reality video within the object. For example, the object may be moved in front of a first three-dimensional virtual reality video and will provide a first three-dimensional preview of the first three-dimensional virtual reality video and then the object may be moved in front of a second three-dimensional virtual reality video and will provide a second three-dimensional preview of the second three-dimensional virtual reality video.

Figure 4B:
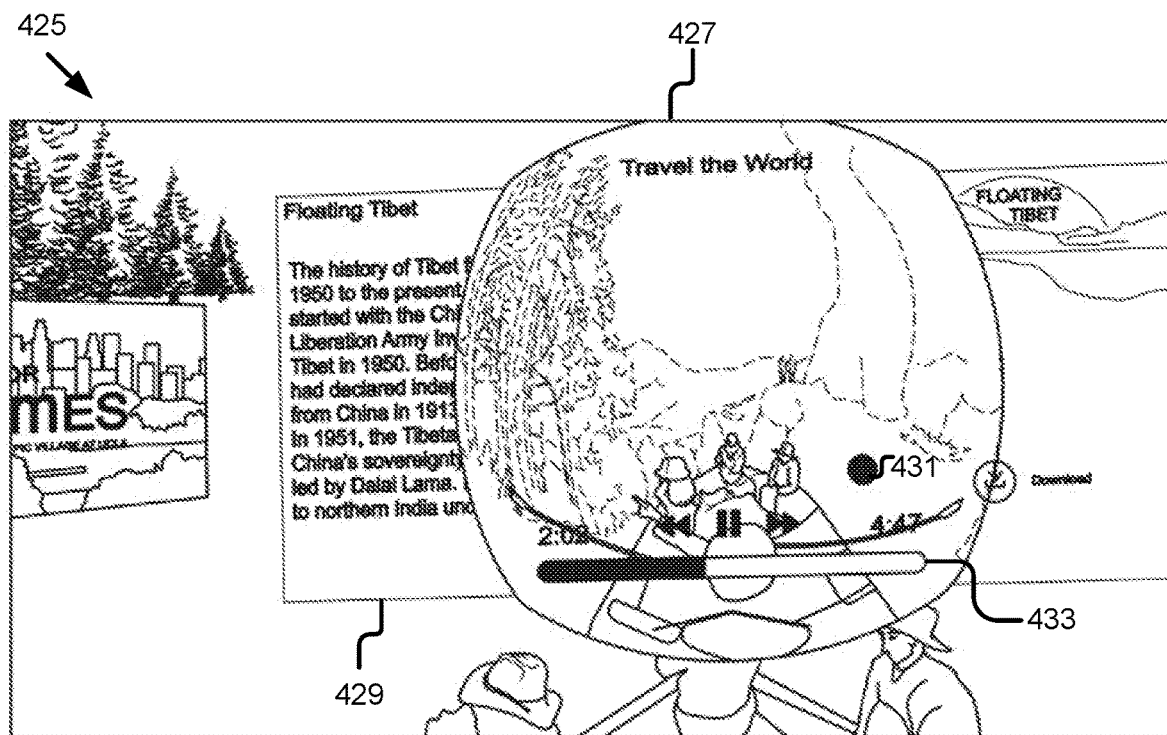
FIG. 4B illustrates an example user interface where an object includes a three-dimensional preview of a three-dimensional virtual reality video according to some embodiments.

FIG. 4B illustrates an example user interface 425 where an object 427 includes a three-dimensional preview of a virtual reality video according to some embodiments. In this example, the two-dimensional selectable icon corresponding to the virtual reality video 429 is visible behind the object 427 and the content of the two-dimensional selectable icon is different from the three-dimensional preview. Specifically, the two-dimensional version includes a summary of the virtual reality video and the three-dimensional preview includes content from the three-dimensional video.

The object 427 is illustrated as being a rounded square, but other sizes are possible, such as spheres, rectangles, ovals, tubes, pentagrams, etc. A user may move the object 427 and modify settings using a peripheral device 127. For example, where the peripheral device 127 is a glove or a touch device (such as the Oculus Go), the user may hold the object 427 in her hand and move it in front of different selectable icons to view their three-dimensional previews.

In some embodiments, the object 427 may be moved and stuck to different locations within the user interface. For example, the user may be able to move the object 427 with a hand and withdraw the hand to keep the object 427 at the same location. In another example, the peripheral device 127 may include a button that, when pressed, assigns the object 427 to a specific location. In yet another example, the user may be able to keep the object 427 at the same location by making a specific motion, such as moving the object 427 forward as if trying to stick the object 427 to the user interface.

In some embodiments, where the peripheral device 127 is not a glove and instead includes hardware such as a mouse, a joystick, or a touch device, the user interface may include a pointer 431 for selecting options in the user interface. For example, the user may be able to move the object 427 using the peripheral device 127 by moving the pointer 431 over the object 427, clicking, and dragging the object 427 to a different location.

In some embodiments, including the one illustrated in FIG. 4B, the object 427 may include a progress bar 433 that is an indicator of a progress of the three-dimensional preview being illustrated in the object 427. In this example, the progress bar 433 illustrates that the three-dimensional virtual reality video is about 40% completed. The user may be able to manipulate the progress bar 433 by selecting a different portion of the progress bar 433. Above the progress bar 433 are additional controls including a current time of the progress of the three-dimensional virtual reality video (2:02), a total time of the three-dimensional virtual reality video (4:47), and buttons to rewind, pause, fast forward, and download the three-dimensional virtual reality video. The user may be able to manipulate the controls above the progress bar by clicking or pushing on the controls using the peripheral device 127.

In addition to providing a three-dimensional preview of the virtual reality video, the object may be used by the user to enter a three-dimensional virtual reality video. For example, a user may enter the three-dimensional virtual reality video by moving the object to be located over the user's head, double clicking on the object, clicking on a button for entering the three-dimensional virtual reality video, etc.

A user may have a poor experience of a three-dimensional virtual reality video if the user wants to change locations within the three-dimensional virtual reality video because the world can be very large and moving around within the three-dimensional virtual reality video to reach a different location may result in the user experiencing nausea. Thus, in some embodiments, a user may rotate the object to enter the three-dimensional virtual reality video at a different location.

Figure 4C:
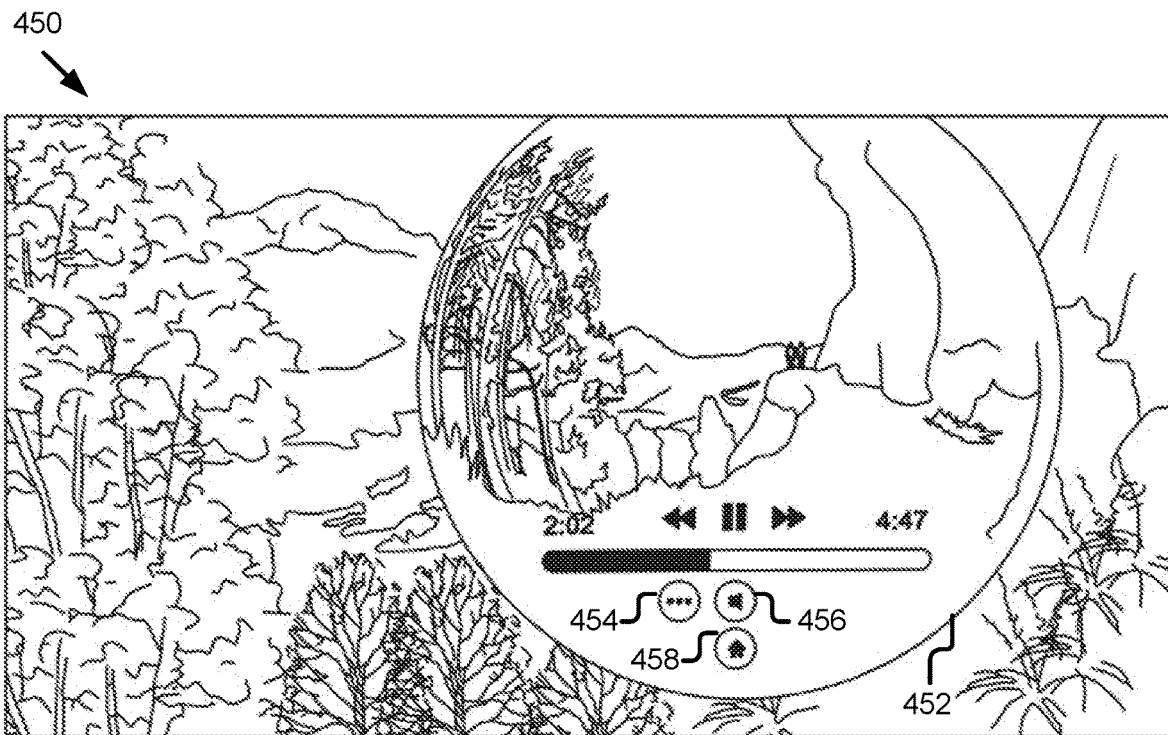
FIG. 4C illustrates an example user interface of a sphere that illustrates a user entering the three-dimensional virtual reality video at a first location according to some embodiments.

FIG. 4C illustrates an example user interface 450 of a sphere 452 that illustrates a user entering the three-dimensional virtual reality video at a first location according to some embodiments. In this example, the user chooses to enter the three-dimensional virtual reality video in a location where the forest meets a rock formation.

In addition, FIG. 4C shows additional options for control buttons that are part of the sphere. Specifically, the control buttons include a button 454 for viewing additional options, a button 456 for controlling a volume of the three-dimensional virtual reality video, and a button 458 for moving to the homepage of the user interface.

If the user does not want to enter the three-dimensional virtual reality video at the first location, the user can modify the sphere to enter the three-dimensional virtual reality video at a different location with different parameters. For example, the user could rotate the sphere to identify any location within the 360 degree sphere to enter into the three-dimensional virtual reality video. In addition, the user can modify the progress bar to change the time at which the user enters the three-dimensional virtual reality video.

Figure 4D:
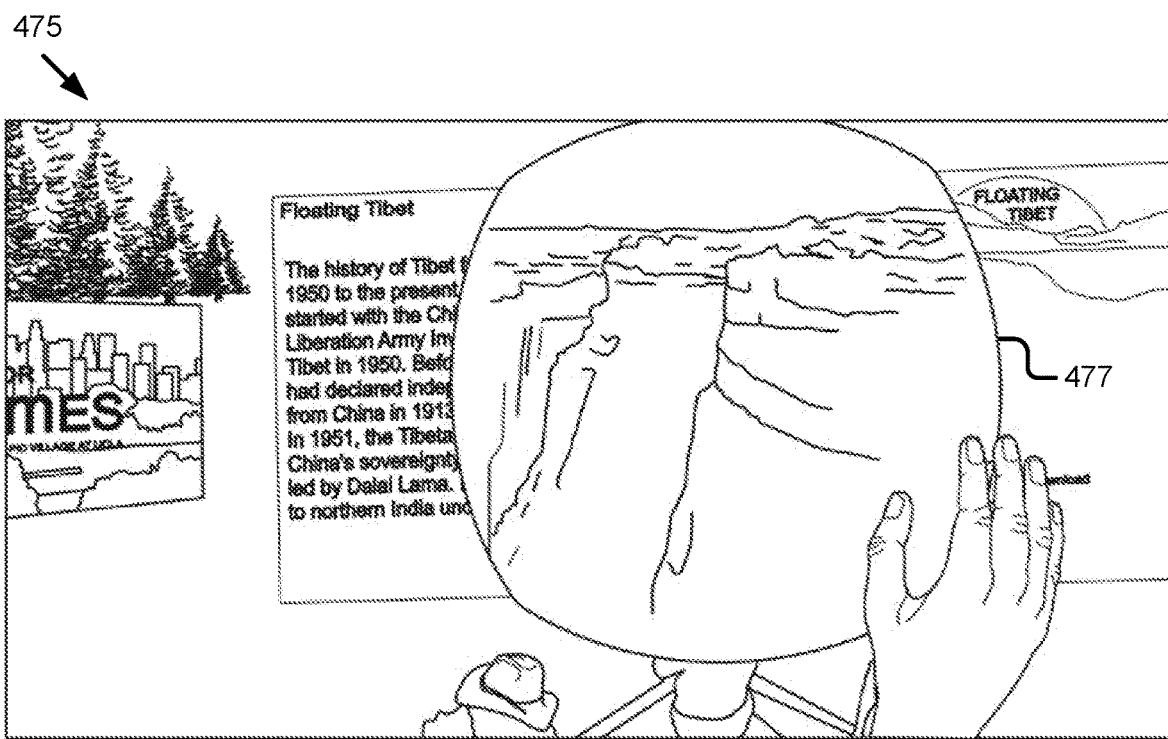
FIG. 4D illustrates an example user interface of the sphere of FIG. 4C where a user has rotated the sphere to enter the three-dimensional virtual reality video at a second location according to some embodiments.

FIG. 4D illustrates an example user interface 475 of the sphere of FIG. 4C where a user has rotated the sphere 477 to enter the three-dimensional virtual reality video at a second location according to some embodiments. The user interface module 306 receives data describing a rotation of the sphere, for example, via the communication module 302. In this example, the user is associated with a peripheral device 127 that is a glove or a touch device. The user interface module 306 generates graphical data for displaying a hand to help the user orient himself within the three-dimensional virtual reality video. When the user moves his hand with the peripheral device 127, the user interface module 306 receives data from the peripheral device 127 and updates the graphical data to display corresponding movement of the hand within the three-dimensional virtual reality video. The user interface module 306 also updates a viewing direction that corresponds to a location within the three-dimensional virtual reality video that is displayed within the sphere.

In FIG. 4D the user rotated the sphere 477 using the glove or touch device to find a second location within the sphere where the user can enter the three-dimensional virtual reality video. This approach to entering the three-dimensional virtual reality video at the second location reduces nausea by allowing the user to reduce the time spent in the three-dimensional virtual reality video at an undesirable location.

Figure 4E:
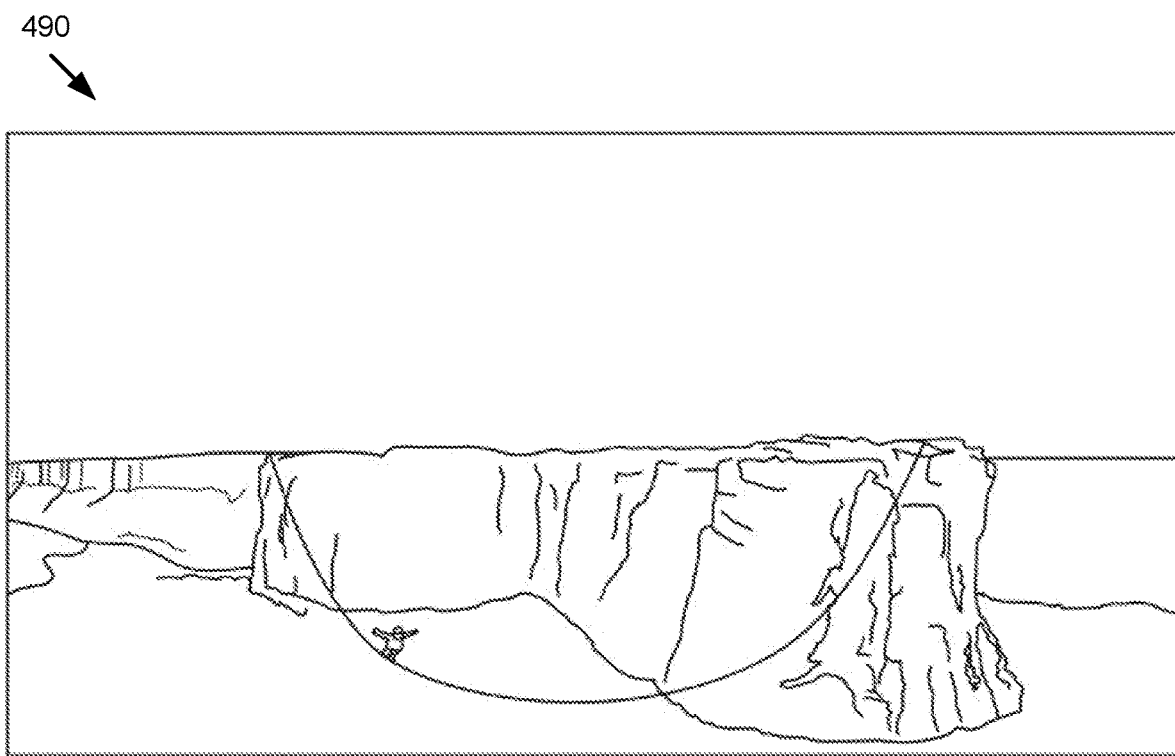
FIG. 4E illustrates an example user interface of the sphere of FIG. 4D after the user has selected to enter at the second location according to some embodiments.

FIG. 4E illustrates an example user interface 490 of the sphere of FIG. 4D after the user has selected to enter at the second location according to some embodiments. As a result of changing the location, the user is able to enter the three-dimensional virtual reality video at the top of the mountain instead of at the bottom of the mountain as illustrated in FIG. 4B.

As described above, there are many ways for a user to enter a three-dimensional virtual reality video using an object. For example, the user may use a peripheral device 127 to double click on the object, the object may include a button for entering the content, etc. In some embodiments, the user may enter the three-dimensional virtual reality video by placing the object over the user's head.

In some embodiments, when the decoder 304 is rendering a first three-dimensional virtual reality video, a preview of a second three-dimensional virtual reality video may be displayed within the object. The user may be able to select the second three-dimensional virtual reality video within the object. As a result, the decoder 304 may reverse the first three-dimensional virtual reality video with the second three-dimensional virtual reality video such that the second three-dimensional virtual reality video renders and the first three-dimensional preview of the first three-dimensional virtual reality video is displayed within the object.

Figure 5A:
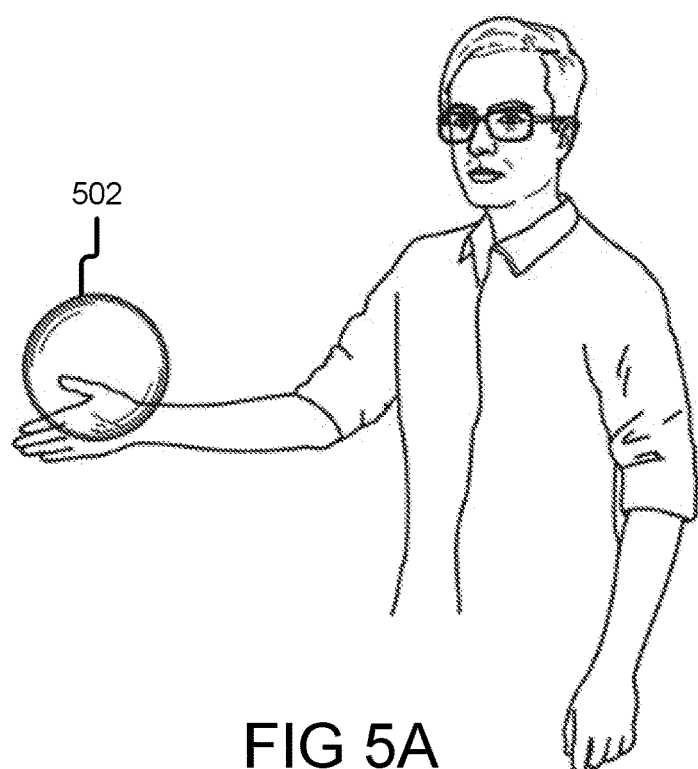
FIG. 5A illustrates an example of a user holding a sphere according to some embodiments.

FIG. 5A illustrates an example 500 of a user holding a sphere 502 according to some embodiments. In this example 500 the user may have gloves or a touch device as a peripheral device 127 and, from the user's perspective, the user is holding the sphere 502 in his hand. As the user makes a motion with the peripheral device 127 to move the sphere 502, the user interface module 306 generates graphical data to illustrate the sphere 502 in the user interface to move based on the user's action with the peripheral device 127. For example, as the user moves the peripheral device 127 to be closer to the user's head, the user interface module 306 generates graphical data to show the sphere 502 moving closer to the user's head.

In some embodiments, as the user moves an object (e.g., a sphere) closer to the user's head, a size of the object increases. For example, as illustrated in FIG. 5A, the size of the sphere is small enough to fit comfortably in the user's hand, but as the user moves the sphere to the user's head, a size of the sphere increases so that the sphere is larger than the user's head. This is illustrated in FIG. 5B and described in greater detail below.

Figure 5B:
FIG. 5B illustrates an example of the sphere of FIG. 5A on top of the user's head so that the user can view three-dimensional virtual reality video according to some embodiments.

FIG. 5B illustrates an example 550 of the sphere 552 of FIG. 5A on top of the user's head so that the user can view three-dimensional virtual reality video according to some embodiments. FIG. 5B illustrates how the user would look to another user inside the three-dimensional virtual reality video. From the user's perspective, once the user places the sphere 552 on his head, he has entered the three-dimensional virtual reality video and his 360 degree environment corresponds to the three-dimensional virtual reality video.

In some embodiments, after the user places the sphere 552 on the user's head, the user interface module 306 generates graphical data that displays an edge of the sphere. For example, the user interface module 306 may display the sphere as a translucent helmet. This effect may be temporary, such as for the five ten seconds after the user puts the sphere over his head. Alternatively, the edge of the sphere may become invisible unless the user moves a peripheral device 127 close to the sphere.

In some embodiments, the user interface module 306 may generate graphical data illustrating an edge of the sphere if the peripheral device 127 is less than a threshold distance from the user's head. For example, the user interface module 306 may illustrate an edge of the sphere if the peripheral device 127 is less than two feet from the sphere because this distance may indicate the user's desire to remove the sphere and, as a result, exit the three-dimensional virtual reality video. Alternatively or additionally, the user interface module 306 may generate graphical data illustrating the edge of the sphere if the peripheral device 127 moves in a way that indicates a trajectory towards the user's head. For example, the user interface module 306 may determine that the peripheral device 127 is moving towards the user's head if the user rotates the user's hand to face the user's head and then begins to move the hand closer to the user's head.

In some embodiments, the user may exit a three-dimensional virtual reality video by removing an object (e.g., a sphere) from the head of the user. For example, the user may move a peripheral device 127 close to the head of the user, which causes the user interface module 306 to display an edge of the sphere. The user may grab the edge of the sphere and remove the sphere from the head of the user. The user interface module 306 may display that the user exits the three-dimensional virtual reality video by displaying the three-dimensional virtual reality video as part of the sphere and thereby no longer surrounding the head of the user.

In some embodiments, the user may then choose to reenter the three-dimensional virtual reality video at a different location, such as by rotating the sphere, which causes the user interface module 306 to generate graphical data displaying the sphere as updating a perspective of the location within the three-dimensional virtual reality video that is displayed within the sphere. The user may then reenter the three-dimensional virtual reality video by selecting the sphere in the rotated position, such as by putting the sphere back on the head of the user, double clicking on the sphere, selecting a button displayed on the sphere for entering the three-dimensional virtual reality video, etc.

As a result of changing from a first location to a second location at which the user enters the three-dimensional virtual reality video, the decoder 304 may change from rendering a first portion of the three-dimensional virtual reality video to rendering a second portion of the three-dimensional virtual reality video to account for the corresponding change to the viewing direction of the user. As a result, the decoder 304 may render the viewing direction corresponding to the second portion of the three-dimensional virtual reality video with a higher resolution than other portions of the three-dimensional virtual reality video that do not correspond to the viewing direction of the user.

In some embodiments, once the user exits a first three-dimensional virtual reality video, the user may choose to enter a second three-dimensional virtual reality video.

Figure 6:
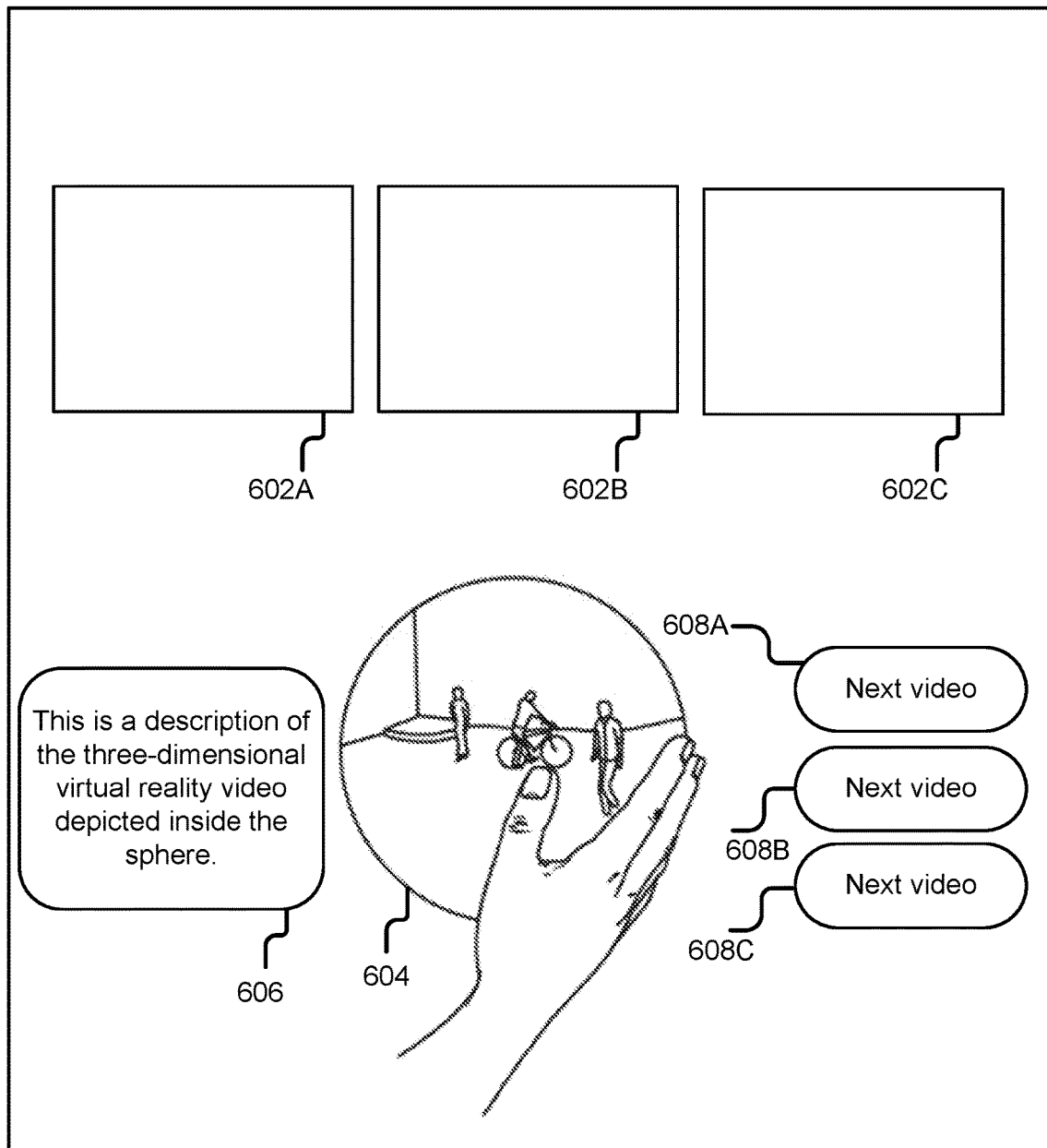
FIG. 6 illustrates an example user interface for navigating between different three-dimensional virtual reality videos according to some embodiments.

FIG. 6 illustrates an example user interface 600 for navigating between different three-dimensional virtual reality videos according to some embodiments. In this example, a set of three-dimensional virtual reality videos are displayed as selectable icons 602A, 602B, and 602C at the top of the user interface 600. A user may view a three-dimensional preview of any of the set of three-dimensional virtual reality videos by dragging and dropping one of the three-dimensional virtual reality videos by clicking and dragging content from one of the selectable icons 602A, 602B, and 602C to the sphere 604. Once the user drags content to the sphere 604, the user interface module 306 generates a three-dimensional preview of the selected three-dimensional virtual reality video.

In some embodiments, the user interface module 306 generates additional information about a subject matter of the three-dimensional virtual reality video in proximity to the sphere 604. For example, the information box 606 to the left of the sphere 604 includes additional information, such as a description of the content depicted by the selected three-dimensional virtual reality video. The next boxes 608A, 608B, 608C to the right of the sphere 604 may include options for selecting additional previews of three-dimensional virtual reality videos to view in the sphere 604.

The user interface module 306 may organize the set of three-dimensional virtual reality videos in different ways between the selectable icons 602A, 602B, and 602C and the next boxes 608A, 608B, 608C. For example, the selectable icons 602A, 602B, and 602C may include examples of the most popular three-dimensional virtual reality video for three different categories, such as travel, action, and documentaries. The next boxes 608A, 608B, 608C may include three-dimensional virtual reality videos within the same categories that are organized, for example, according to the most viewed three-dimensional virtual reality videos within the same categories.

Figure 7A:
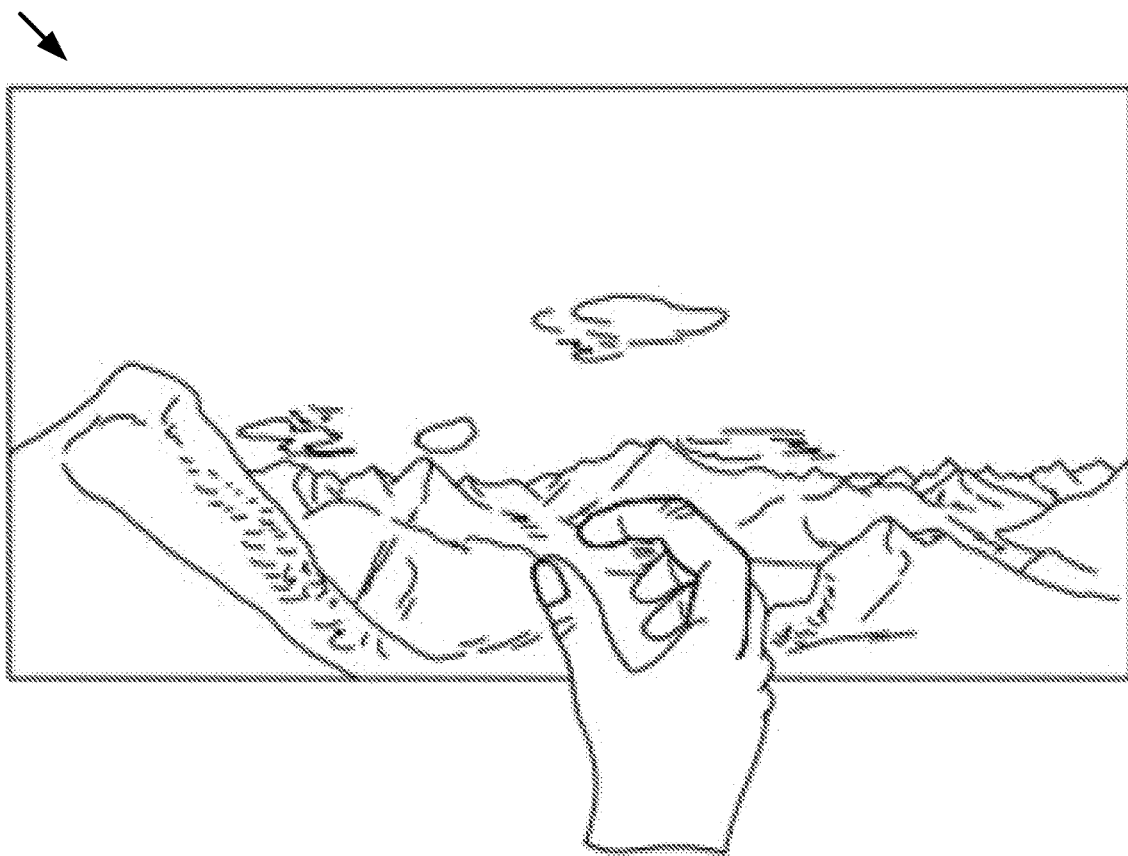
FIG. 7A illustrates an example of a user grabbing the three-dimensional virtual reality video according to some embodiments.

In some embodiments, a user may be able to grab a three-dimensional virtual reality video and place it into an object. FIG. 7A illustrates an example user interface 700 of a user grabbing the three-dimensional virtual reality video by using a peripheral device 127 to grab at the three-dimensional virtual reality video. The user may grab the three-dimensional virtual reality video by pressing a grab button on a peripheral device 127 or by moving a finger and a thumb to be closer to each other to pinch the three-dimensional virtual reality video from the screen to a sphere.

Figure 7B:
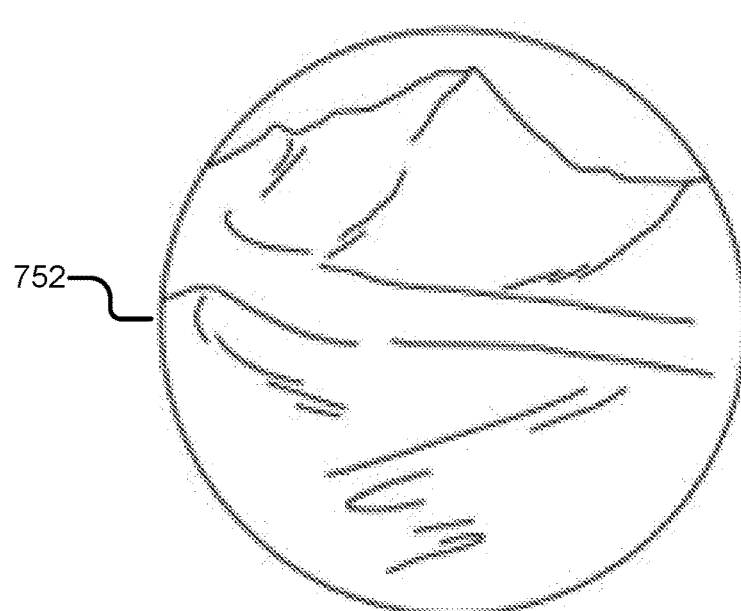
FIG. 7B illustrates an example of the three-dimensional virtual reality video grabbed from FIG. 7A and displayed within an object according to some embodiments.

FIG. 7B illustrates an example user interface 750 of the three-dimensional virtual reality video pinched from FIG. 7A and displayed within an object 752 according to some embodiments. Once the three-dimensional virtual reality video is in the object 752, the user can rotate the object, put the object on a head of the user, move the object and take the three-dimensional virtual reality video and put it in a different location within the user interface 750, etc.

Example Flow Diagrams

FIG. 8 illustrates an example flow diagram 800 for generating an object for viewing a three-dimensional preview of a three-dimensional virtual reality video according to some embodiments. The steps in FIG. 8 may be performed by the virtual reality application 103a stored on the video streaming server 101, the virtual reality application 103b stored on the viewing device 125, or a combination of the virtual reality application 103a stored on the video streaming server 101 and the virtual reality application 103b stored on the viewing device 125.

At step 802, a set of three-dimensional virtual reality videos is generated by stitching together image frames of one or more environments captured by a camera array. At step 804, graphical data is generated for displaying a virtual reality user interface that includes (1) selectable icons that correspond to the set of three-dimensional virtual reality videos and (2) and object. The object may be in a variety of shapes including, for example, a sphere. At step 808, a three-dimensional preview of the first three-dimensional virtual reality video is provided within the object. For example, if the user moves the object in front of a selectable icon for a first three-dimensional virtual reality video of a murder mystery movie, a three-dimensional preview of the murder mystery movie is provided within the object.

FIG. 9 illustrates an example flow diagram for using a sphere to view three-dimensional virtual reality video and reorient the user's location within the three-dimensional virtual reality video. The steps in FIG. 9 may be performed by the virtual reality application 103a stored on the video streaming server 101, the virtual reality application 103b stored on the viewing device 125, or a combination of the virtual reality application 103a stored on the video streaming server 101 and the virtual reality application 103b stored on the viewing device 125.

At step 902, graphical data is generated for displaying a virtual reality user interface that includes a three-dimensional virtual reality video that is illustrated as being inside a sphere. FIG. 4B is an example of how the three-dimensional virtual reality video looks inside a sphere. At step 904, it is determined, based on movement of a peripheral device 127, that a user selects the sphere in the virtual reality user interface and the user moves the sphere on a head of the user. FIGS. 5A-5B illustrate an example of a user moving the sphere to be on the head of the user. At step 906, the three-dimensional virtual reality video is displayed in the sphere surrounding the head of the user such that the user views a 360 degree environment corresponding to the three-dimensional virtual reality video.

Figure 10:
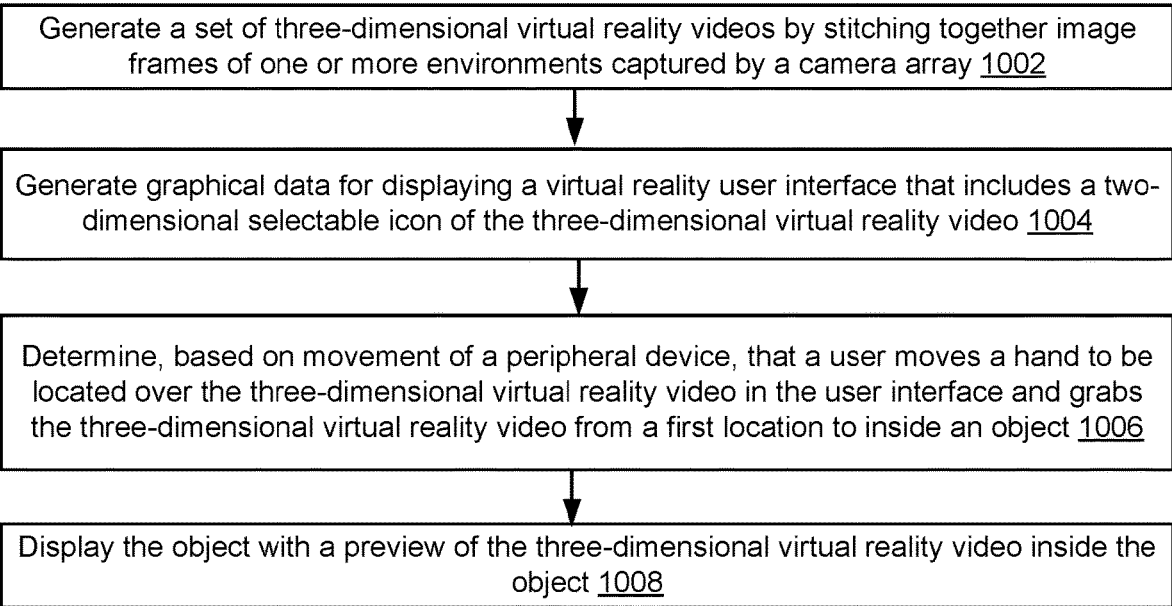
FIG. 10 illustrates an example flow diagram for moving a three-dimensional virtual reality video from a first location into an object according to some embodiments.

FIG. 10 illustrates an example flow diagram for moving a three-dimensional virtual reality video from a first location into an object according to some embodiments. The steps in FIG. 10 may be performed by the virtual reality application 103a stored on the video streaming server 101, the virtual reality application 103b stored on the viewing device 125, or a combination of the virtual reality application 103a stored on the video streaming server 101 and the virtual reality application 103b stored on the viewing device 125.

At step 1002, a set of three-dimensional virtual reality videos are generated by stitching together image frames of one or more environments captured by a camera array. At step 1004, graphical data is generated for displaying a virtual reality user interface that includes a two-dimensional selectable icon of the three-dimensional virtual reality video. At step 1006, it is determined, based on movement of a peripheral device 127, that a user moves a hand to be located over the three-dimensional virtual reality video in the user interface and moves a finger and thumb to be closer to each other. FIG. 7A illustrates an example of a user moving a hand to be located over the three-dimensional virtual reality video in the user interface and moves a finger and thumb to be closer to each other. At step 1008, an object is generated that includes a preview of the three-dimensional virtual reality video inside the object. FIG. 7B illustrates an example of an object that includes a preview of the three-dimensional virtual reality video.

Embodiments described herein contemplate various additions, modifications, and/or omissions to the above-described panoptic virtual presence system, which has been described by way of example only. Accordingly, the above-described camera system should not be construed as limiting. For example, the camera system described with respect to FIG. 1 below may include additional and/or different components or functionality than described above without departing from the scope of the disclosure.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the inventions have been described in detail, it may be understood that the various changes, substitutions, and alterations could be made hereto without departing from the spirit and scope of the invention.

What is claimed is:

1. A computer-implemented method comprising:
    displaying a virtual reality user interface that includes a three-dimensional (3D) virtual reality video that is illustrated as being inside a sphere;
    determining, based on movement of a peripheral device, a selection of the sphere in the virtual reality user interface;
    displaying the 3D virtual reality video in a 360 degree environment as viewed from a first viewing direction that corresponds to a first location within the sphere;
    detecting user input to exit the 3D virtual reality video displayed in the 360 degree environment;
    displaying again, in response to the exit, the virtual reality user interface that includes the 3D virtual reality video that is illustrated as being inside the sphere;
    receiving, from the peripheral device, data describing a rotation of the sphere within the virtual reality user interface; and
    displaying, within the virtual reality user interface, the sphere as being rotated including updating the first viewing direction to a second viewing direction that corresponds to a second location within the sphere.

2. The method of claim 1, further comprising:
    determining, based on movement of the peripheral device, that the sphere is moved closer to a head of a user; and
    increasing a size of the sphere as the sphere is moved closer to the head of the user.

3. The method of claim 2, further comprising:
    responsive to displaying the 3D virtual reality video in the 360 degree environment, removing an edge of the sphere such that the sphere is invisible to the user;
    detecting, based on movement of the peripheral device, that a hand of the user is less than a threshold distance from the head of the user; and
    responsive to the hand of the user being less than the threshold distance from the head of the user, displaying an edge of the sphere.

4. The method of claim 3, wherein:
    detecting user input to exit the 3D virtual reality video displayed in the 360 degree environment comprises detecting, based on movement of the peripheral device, that the sphere is moved away from the head of the user by a grabbing motion along the edge of the sphere.

5. The method of claim 1, further comprising:
    receiving a selection of the sphere in a rotated position; and
    displaying the 3D virtual reality video in the 360 degree environment as viewed from a location that corresponds to the rotated position.

6. The method of claim 1, further comprising:
    determining a viewing direction of a user based on a configuration of the sphere; and
    rendering a first portion of the 3D virtual reality video that corresponds to the viewing direction of the user with a higher resolution than other portions of the 3D virtual reality video that do not correspond to the viewing direction of the user.

7. The method of claim 1, further comprising:
    determining, based on movement of the peripheral device, a selection of the rotated sphere in the virtual reality user interface; and
    displaying the 3D virtual reality video in the 360 degree environment as viewed from the second viewing direction that corresponds to the second location within the sphere.

8. The method of claim 1, wherein the sphere includes an indicator of a progress of the 3D virtual reality video.

9. A system comprising:
    one or more processors; and
    a memory with instructions stored thereon that, when executed by the one or more processors, cause the one or more processors to perform operations comprising:
        displaying a virtual reality user interface that includes a three-dimensional (3D) virtual reality video that is illustrated as being inside a sphere;
        determining, based on movement of a peripheral device, a selection of the sphere in the virtual reality user interface;
        displaying the 3D virtual reality video in a 360 degree environment as viewed from a first viewing direction that corresponds to a first location within the sphere;
        detecting user input to exit the 3D virtual reality video displayed in the 360 degree environment;
        displaying again, in response to the exit, the virtual reality user interface that includes the 3D virtual reality video that is illustrated as being inside the sphere;
        receiving, from the peripheral device, data describing a rotation of the sphere within the virtual reality user interface; and
        displaying, within the virtual reality user interface, the sphere as being rotated including updating the first viewing direction to a second viewing direction that corresponds to a second location within the sphere.

10. The system of claim 9, wherein the instructions cause the one or more processors to perform further operations comprising:
    determining, based on movement of the peripheral device, that the sphere is moved closer to a head of a user; and
    increasing a size of the sphere as the sphere is moved closer to the head of the user.

11. The system of claim 10, wherein the instructions cause the one or more processors to perform further operations comprising:
    responsive to displaying the 3D virtual reality video in the 360 degree environment, removing an edge of the sphere such that the sphere is invisible to the user;
    detecting, based on movement of the peripheral device, that a hand of the user is less than a threshold distance from the head of the user; and
    responsive to the hand of the user being less than the threshold distance from the head of the user, displaying an edge of the sphere.

12. The system of claim 11, wherein:
    detecting user input to exit the 3D virtual reality video displayed in the 360 degree environment comprises detecting, based on movement of the peripheral device, that the sphere is moved away from the head of the user by a grabbing motion along the edge of the sphere.

13. The system of claim 9, wherein the instructions cause the one or more processors to perform further operations comprising:
    receiving a selection of the sphere in a rotated position; and
    displaying the 3D virtual reality video in the 360 degree environment as viewed from a location that corresponds to the rotated position.

14. The system of claim 9, wherein the instructions cause the one or more processors to perform further operations comprising:
    determining a viewing direction of a user based on a configuration of the sphere; and
    rendering a first portion of the 3D virtual reality video that corresponds to the viewing direction of the user with a higher resolution than other portions of the 3D virtual reality video that do not correspond to the viewing direction of the user.

15. The system of claim 9, wherein the instructions cause the one or more processors to perform further operations comprising:
    determining, based on movement of the peripheral device, a selection of the rotated sphere in the virtual reality user interface; and
    displaying the 3D virtual reality video in the 360 degree environment as viewed from the second viewing direction that corresponds to the second location within the sphere.

16. A non-transitory computer readable medium with instructions that, when executed by one or more computers, cause the one or more computers to perform operations, the operations comprising:
    displaying a virtual reality user interface that includes a three-dimensional (3D) virtual reality video that is illustrated as being inside a sphere;
    determining, based on movement of a peripheral device, a selection of the sphere in the virtual reality user interface;
    displaying the 3D virtual reality video in a 360 degree environment as viewed from a first viewing direction that corresponds to a first location within the sphere;
    detecting user input to exit the 3D virtual reality video displayed in the 360 degree environment;
    displaying again, in response to the exit, the virtual reality user interface that includes the 3D virtual reality video that is illustrated as being inside the sphere;
    receiving, from the peripheral device, data describing a rotation of the sphere within the virtual reality user interface; and
    displaying, within the virtual reality user interface, the sphere as being rotated including updating the first viewing direction to a second viewing direction that corresponds to a second location within the sphere.

17. The computer-readable medium of claim 16, wherein the operations further comprise:
    determining, based on movement of the peripheral device, that the sphere is moved closer to a head of a user; and
    increasing a size of the sphere as the sphere is moved closer to the head of the user.

18. The computer-readable medium of claim 17, wherein the operations further comprise:
    responsive to displaying the 3D virtual reality video in the 360 degree environment, removing an edge of the sphere such that the sphere is invisible to the user;
    detecting, based on movement of the peripheral device, that a hand of the user is less than a threshold distance from the head of the user; and
    responsive to the hand of the user being less than the threshold distance from the head of the user, displaying an edge of the sphere.

19. The computer-readable medium of claim 18, wherein:
    detecting user input to exit the 3D virtual reality video displayed in the 360 degree environment comprises detecting, based on movement of the peripheral device, that the sphere is moved away from the head of the user by a grabbing motion along the edge of the sphere.

20. The computer-readable medium of claim 16, wherein the operations further comprise:
    receiving a selection of the sphere in a rotated position; and
    displaying the 3D virtual reality video in the 360 degree environment as viewed from a location that corresponds to the rotated position.

* * * * *